US011168825B2

(12) United States Patent
DiChristopher, Jr.

(10) Patent No.: US 11,168,825 B2
(45) Date of Patent: Nov. 9, 2021

(54) QUICK COUPLING VALVE AND QUICK COUPLING VALVE KEY

(71) Applicant: Leemco, Inc., Folsom, CA (US)

(72) Inventor: Nunzio J. DiChristopher, Jr., Folsom, CA (US)

(73) Assignee: LEEMCO, Inc., Folsom, CA (US)

( * ) Notice: Subject to any disclaimer, the term of this patent is extended or adjusted under 35 U.S.C. 154(b) by 0 days.

(21) Appl. No.: 16/781,699

(22) Filed: Feb. 4, 2020

(65) Prior Publication Data

US 2020/0248855 A1  Aug. 6, 2020

Related U.S. Application Data

(60) Provisional application No. 62/800,922, filed on Feb. 4, 2019.

(51) Int. Cl.
*F16L 37/44* (2006.01)
*F16K 31/60* (2006.01)

(52) U.S. Cl.
CPC ............ *F16L 37/44* (2013.01); *F16K 31/602* (2013.01)

(58) Field of Classification Search
CPC . F16L 37/44; F16L 37/40; F16L 37/38; F16K 31/602
USPC ...... 239/570; 251/149.1; 137/614.03, 614.04
See application file for complete search history.

(56) References Cited

U.S. PATENT DOCUMENTS

| | | | | |
|---|---|---|---|---|
| 4,072,271 A | * | 2/1978 | Voss et al. .............. | B05B 1/302 239/541 |
| 4,784,179 A | * | 11/1988 | Carbenay ................ | F16K 11/00 137/607 |
| 5,123,441 A | * | 6/1992 | Hogue et al. ......... | B67D 7/0294 137/381 |
| 5,353,651 A | * | 10/1994 | Pate ........................ | F16L 37/23 73/861.85 |
| 5,575,308 A | * | 11/1996 | Marandi ............. | E04H 12/2215 137/356 |
| 5,911,403 A | * | 6/1999 | deCler et al. ........ | B67D 7/0294 251/149.6 |

* cited by examiner

*Primary Examiner* — Kevin L Lee
(74) *Attorney, Agent, or Firm* — McHale & Slavin, P.A.

(57) ABSTRACT

Systems and devices for use in delivery of water to areas of land. The systems include quick coupling valves, quick coupling valve keys, and fluid delivery systems that utilize quick coupling valves and quick coupling valve keys.

20 Claims, 29 Drawing Sheets

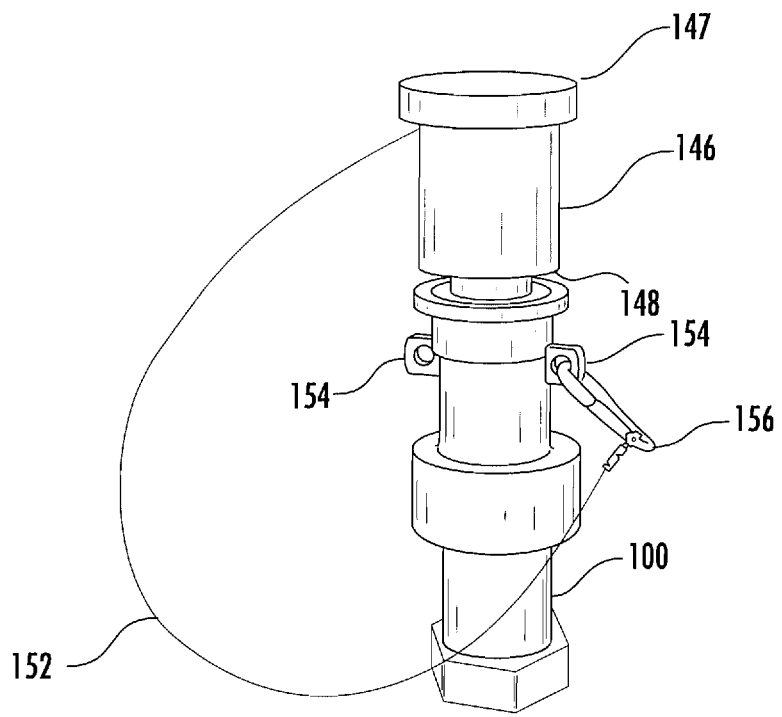
FIG. 8
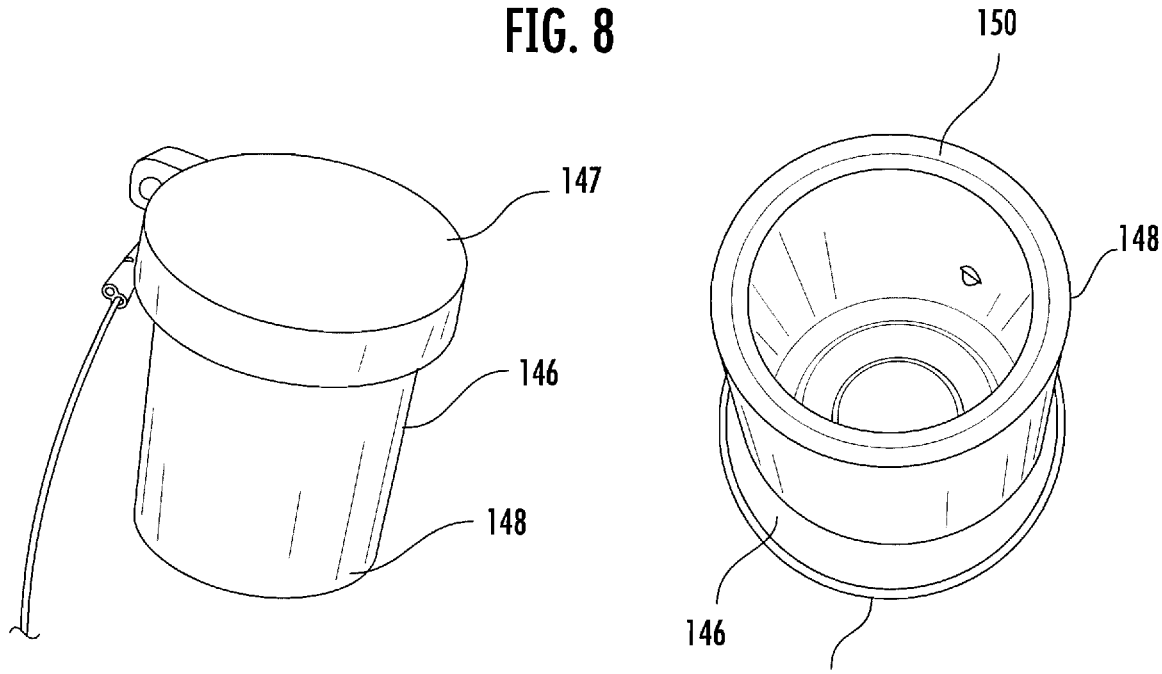
FIG. 9
FIG. 10

QUICK COUPLING VALVE AND QUICK COUPLING VALVE KEY

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/800,922, entitled "QUICK COUPLING VALVE AND QUICK COUPLING VALVE KEY" filed Feb. 4, 2019. The contents of the above referenced application are incorporated herein by reference in its entirety.

FIELD OF THE INVENTION

The present invention relates to systems and devices for use in delivery of water to areas of land, or more specifically turf; and more particularly, to quick coupling valves, quick coupling valve keys, and fluid delivery systems that utilize quick coupling valves and quick coupling valve keys.

BACKGROUND OF THE INVENTION

Delivery of fluids, such as water, to large areas of land or turf, such as golf courses, is essential to the maintenance and upkeep of the property. Quick coupling valves for providing frequent use watering to areas that contain access to a pressurized pipe line water supply is known. Typical systems, such as those manufactured by TORO, use a key valve that requires alignment means. Such means typically require the equipment to use a stud and alignment notch. Such construction can make it difficult to connect all the pieces of the equipment easily and quickly, as the user must always align the components to have a properly functioning system. In addition to being difficult to set up, such systems are known to have issues with leaking. Finally, typical current key/valve connections require a screwing of the key into the valve. This screwing manner can result in the valve being accidentally unscrewed or removed from the swing joint it is attached to buried in the ground. The user cannot see this connection since it is buried in the ground and may be unaware of the danger.

SUMMARY OF THE INVENTION

The present invention relates to systems and devices for use in delivery of water to areas of land or turf. The invention relates to quick coupling valves, quick coupling valve keys, and fluid delivery systems that utilize quick coupling valves and quick coupling valve keys. The quick coupling valve and quick coupling valve key are configured to quickly and easily secure or engage together without the requirement of using alignment members. The quick coupling valve key is configured to secure or engage with the quick coupling valve in any direction. The quick coupling valve key is also configured to secure or engage with the quick coupling valve and activate fluid flow with the use of a single lever. Such configuration utilizes a single lever to control two cams, and thus two actions, locking the devices together and activating fluid flow. The present invention further provides for devices that are able to engage without turning or screwing the quick coupling valve key into the quick coupling valve, thus enhancing the safety when in use.

Accordingly, it is an objective of the invention to provide systems for use in delivering fluids to an area.

It is a further objective of the invention to provide devices for use in delivering fluids to an area.

It is yet another objective of the invention to provide fluid delivery systems that utilize quick coupling valves and quick coupling valve keys.

It is a still further objective of the invention to provide a quick coupling valve.

It is a further objective of the invention to provide a quick coupling valve key.

It is yet another objective of the invention to provide fluid delivery systems that utilize a quick coupling valve and a quick coupling valve key that prevent bleeding of fluids when in use.

It is a still further objective of the invention to provide a quick coupling valve that prevents bleeding of fluids when in use with a quick coupling valve key.

It is a further objective of the invention to provide a quick coupling valve key that prevents bleeding of fluids when in use with a quick coupling valve.

It is yet another objective of the invention to provide fluid delivery systems that utilize a quick coupling valve and a quick coupling valve key that can be connected without using alignment guides or members.

It is a still further objective of the invention to provide a quick coupling valve that can be connected without using alignment guides or members when in use with a quick coupling valve key.

It is a further objective of the invention to provide a quick coupling valve key that can be connected without using alignment guides or members when in use with a quick coupling valve.

It is yet another objective of the invention to provide fluid delivery systems that utilize a quick coupling valves and a quick coupling valve key that can be connected in any direction.

It is a still further objective of the invention to provide a quick coupling valve that can be connected with a quick coupling valve key in any direction.

It is a further objective of the invention to provide a quick coupling valve key that can be connected with a quick coupling valve in any direction.

It is a further objective of the invention to provide a quick coupling valve key that can be connected with a quick coupling valve without any screwing or turning of the quick coupling valve key into the coupling valve, thereby increasing product safety.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 8 is a perspective view of the quick coupling valve, shown with a cover;

FIG. 9 is a top perspective view of the coupling valve cover;

FIG. 10 is a bottom perspective view of the coupling valve cover;

DETAILED DESCRIPTION OF THE INVENTION

Figure 1A:
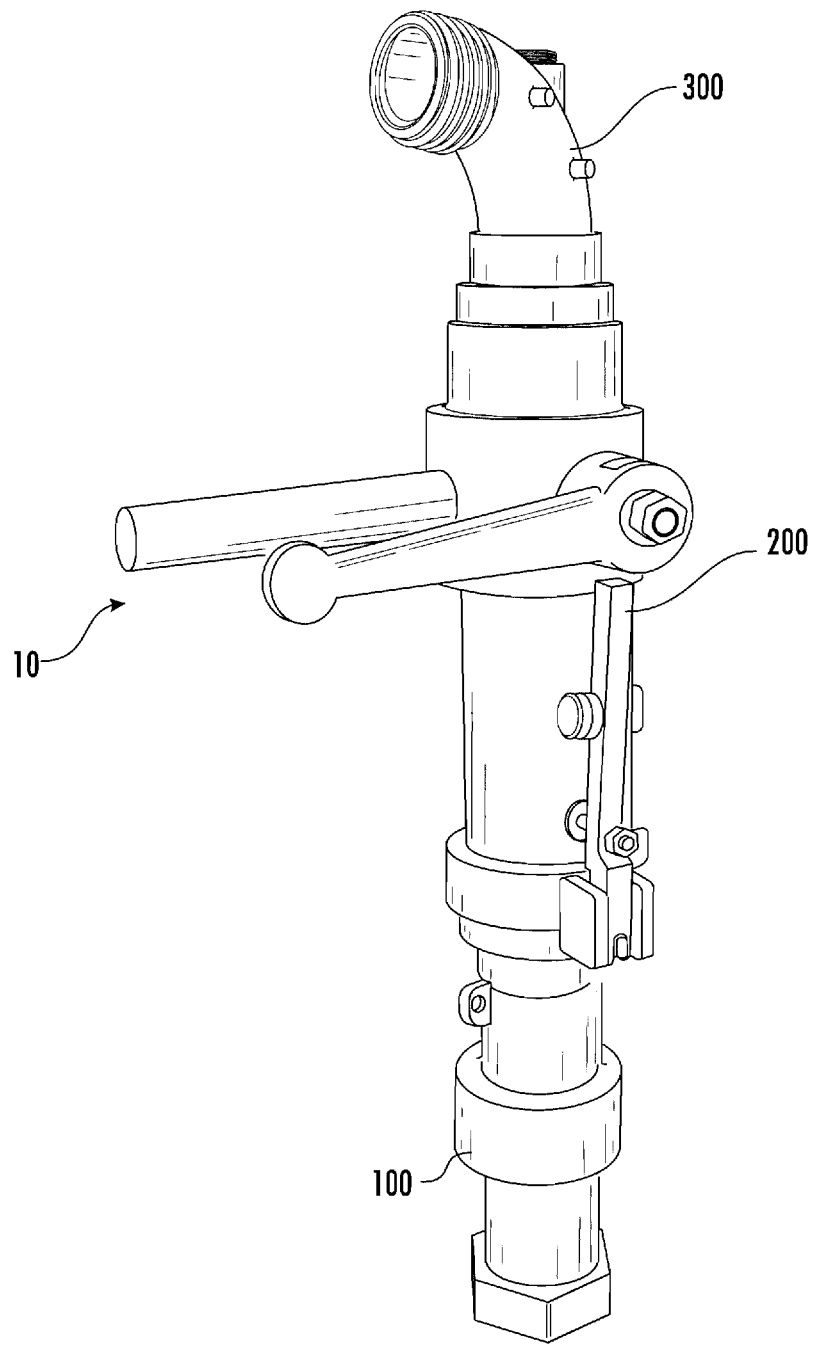
FIG. 1A is a perspective view of an embodiment of a system that utilizes quick coupling valves and quick coupling valve keys.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1B:
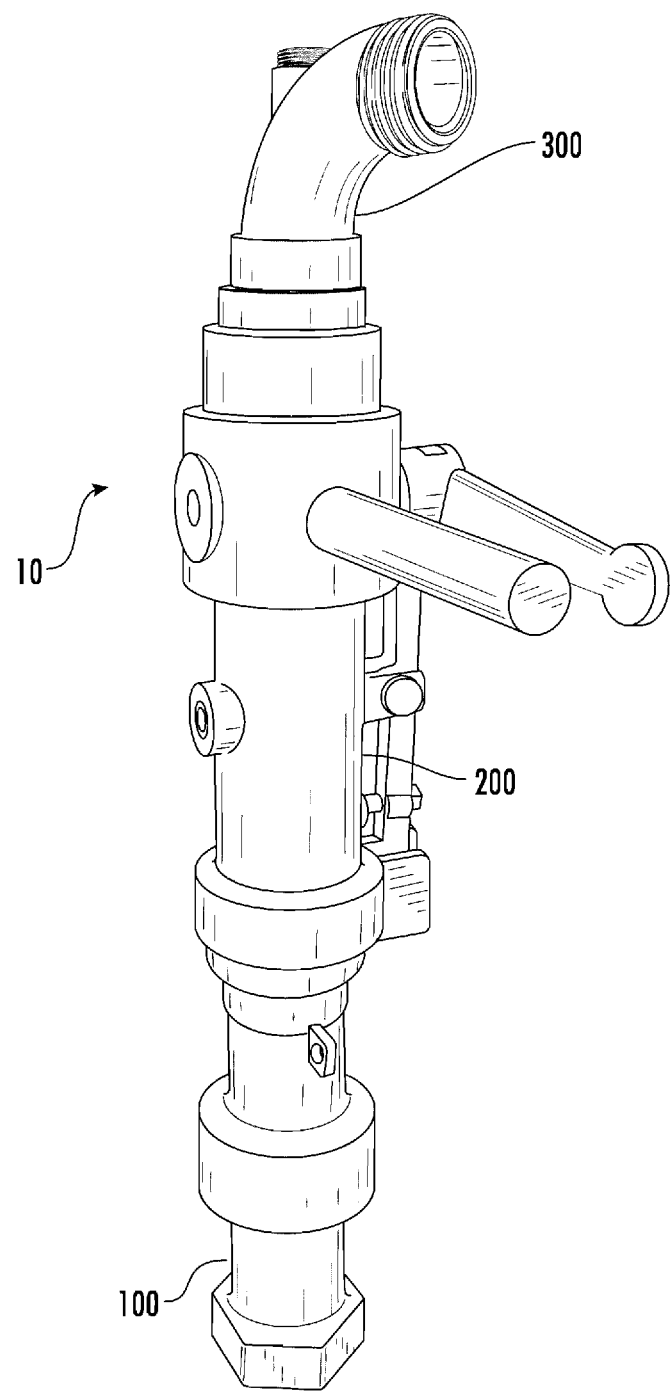
FIG. 1B is an alternative perspective view of the system that utilizes quick coupling valves and quick coupling valve keys.
Figure 1C:
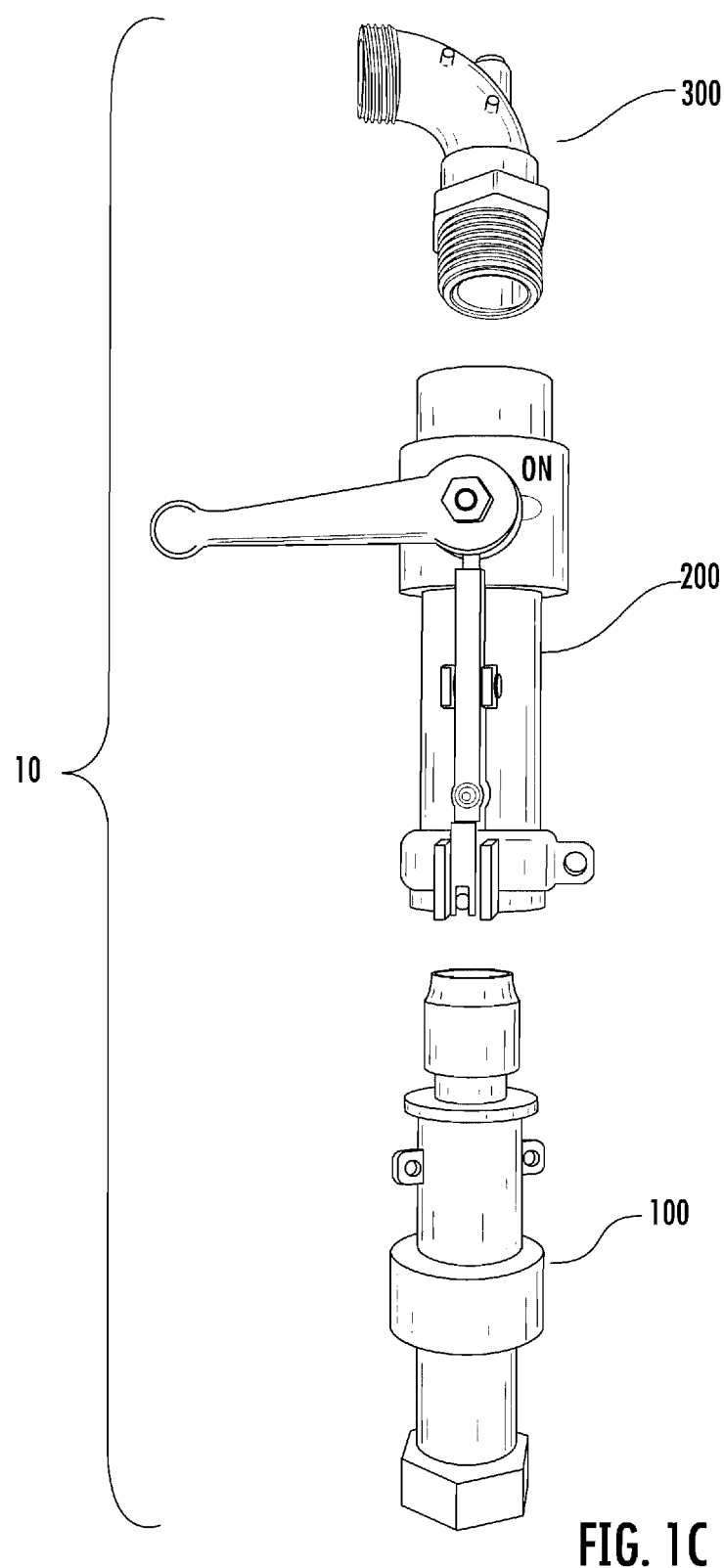
FIG. 1C is an exploded view of the piping systems that utilize quick coupling valves and quick coupling valve keys.

Referring to FIGS. 1A-1C, an illustrative embodiment of a fluid delivery system that utilizes quick coupling valves and quick coupling valve keys, referred to generally as system 10, is shown. The system 10 includes one or more components of a quick coupling valve 100, a quick coupling valve key 200, and a swivel 300.

FIGS. 2-7 illustrate the quick coupling valve 100 in greater detail. The quick coupling valve 100 comprises a coupling valve main body 102 having a first end 104 and an opposing second end 106. The first end 104 has a valve key stop 108, illustrated as a circular flange 110 which extends out past the main body first end 102. The valve key stop 108 has a generally planar upper surface 112 sized and shaped to engage with at least a part or portion of the quick coupling valve key 200. The valve key stop 108 is designed to prevent the quick coupling valve key 200 from moving down the coupling valve main body 102 when the two engage or interact. A valve stem 114 extends upwardly and away from the main body first end 104. The valve stem 114 comprises a lower portion 116 and an upper portion 118. The lower portion 116 is illustrated as a generally cylindrical body that is integrally formed from, or attached and secured to, the coupling valve main body 102. The upper portion 118 is shown as a generally cylindrical body having an inwardly tapered upper surface 120, and terminating in an opening 122 (see also FIG. 6). The valve stem 114 may be secured to the coupling valve main body 102 via valve threading 123 (see FIG. 12).

The lower portion 116 preferably has a smaller diameter than the diameter of the main body 104 and the diameter of the upper portion 118. This configuration provides an overhang surface 124. The distance D, see FIG. 2, between the overhang surface 124 and the valve key stop upper surface 112 defines a locking slot 126. The locking slot 126 is configured to engage with a portion of the coupling valve key 200, thus maintaining the two components engaged and secured together when required. The locking slot 126 is formed around the perimeter of the valve stem lower portion 116, thus providing a mechanism for locking with the coupling valve key 200 in any direction.

Figure 1D:
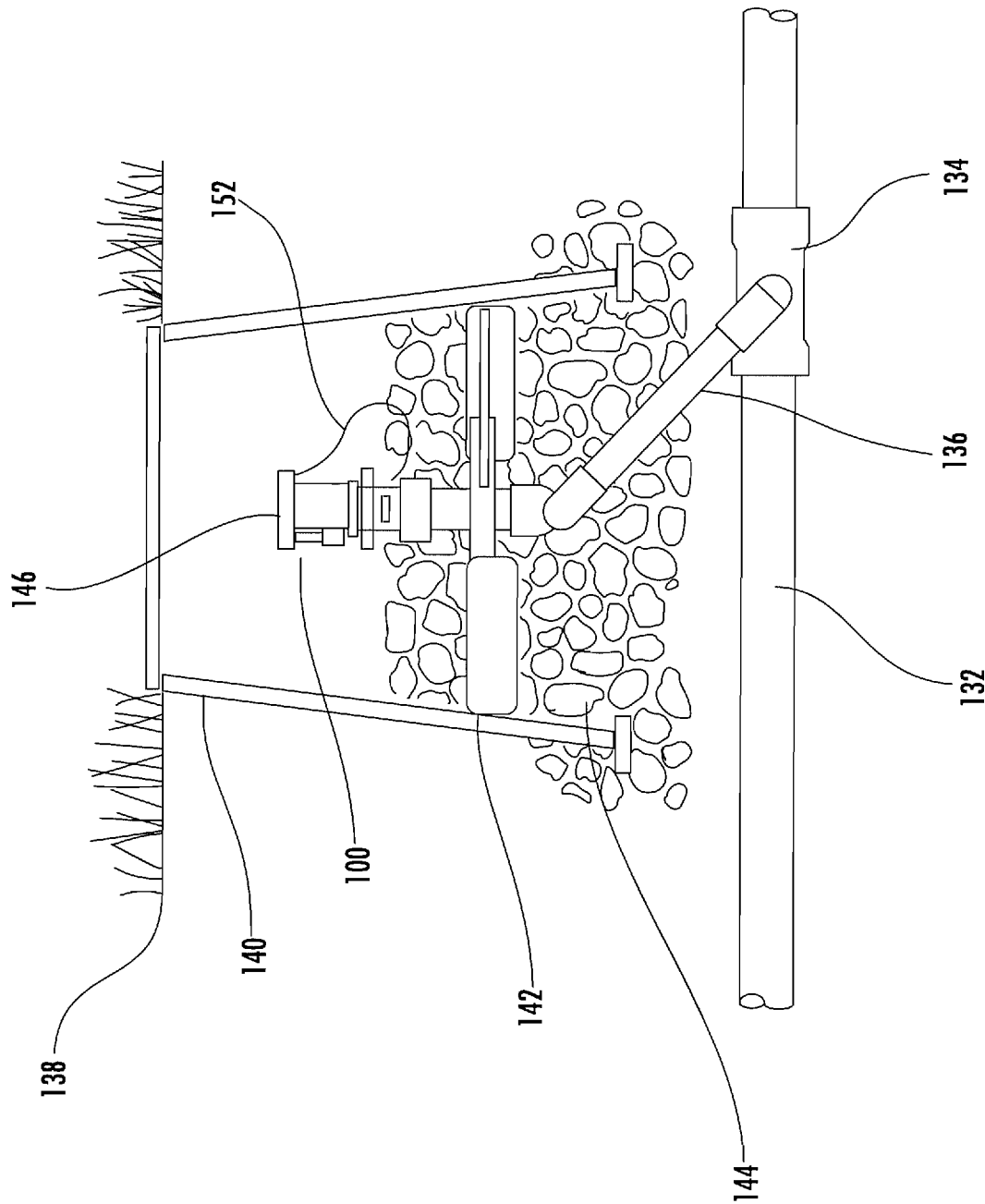
FIG. 1D illustrates the quick coupling valves coupled to a main water line.
Figure 2:
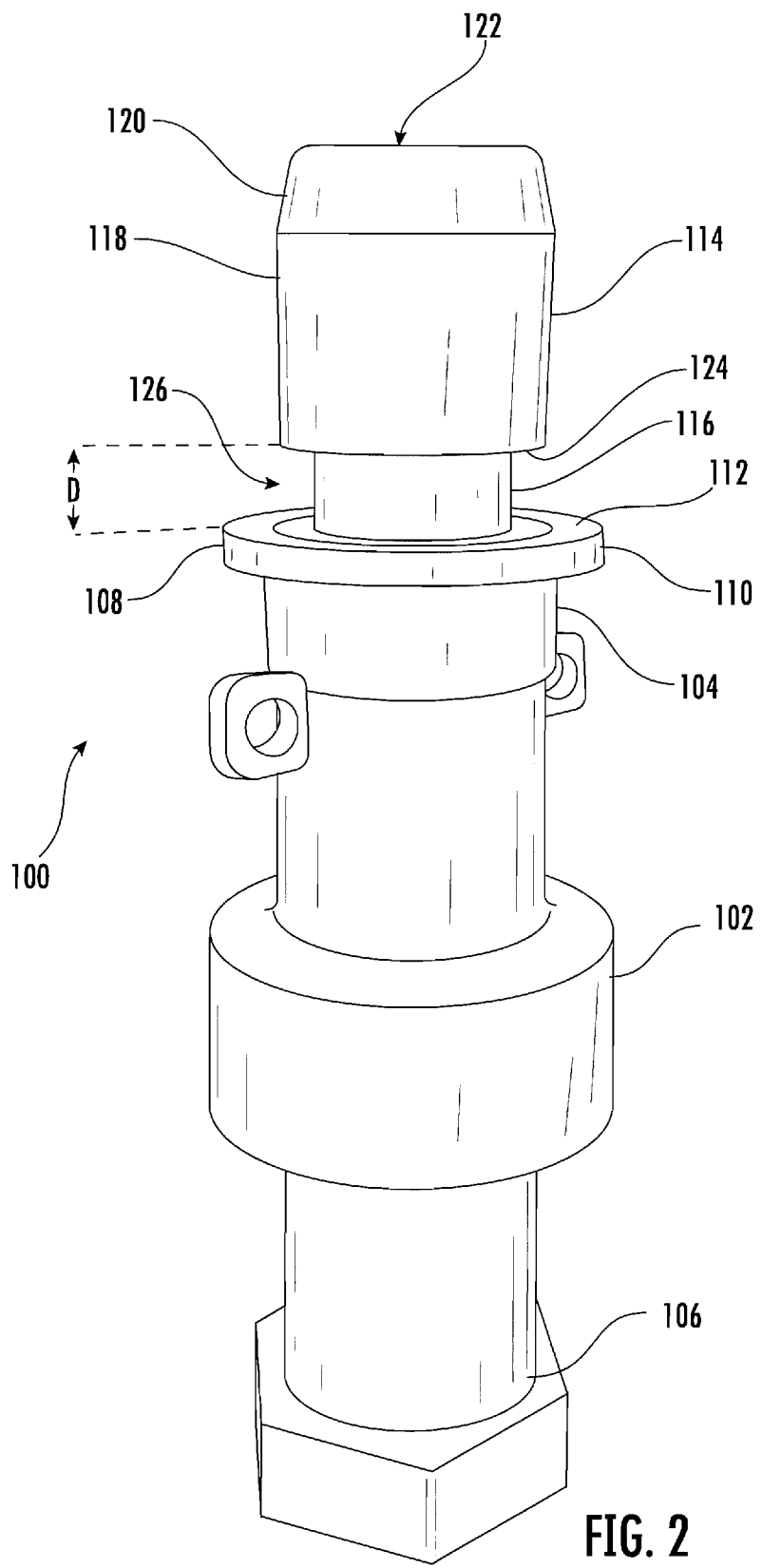
FIG. 2 is a perspective view of an illustrative embodiment of a quick coupling valve.
Figure 3:
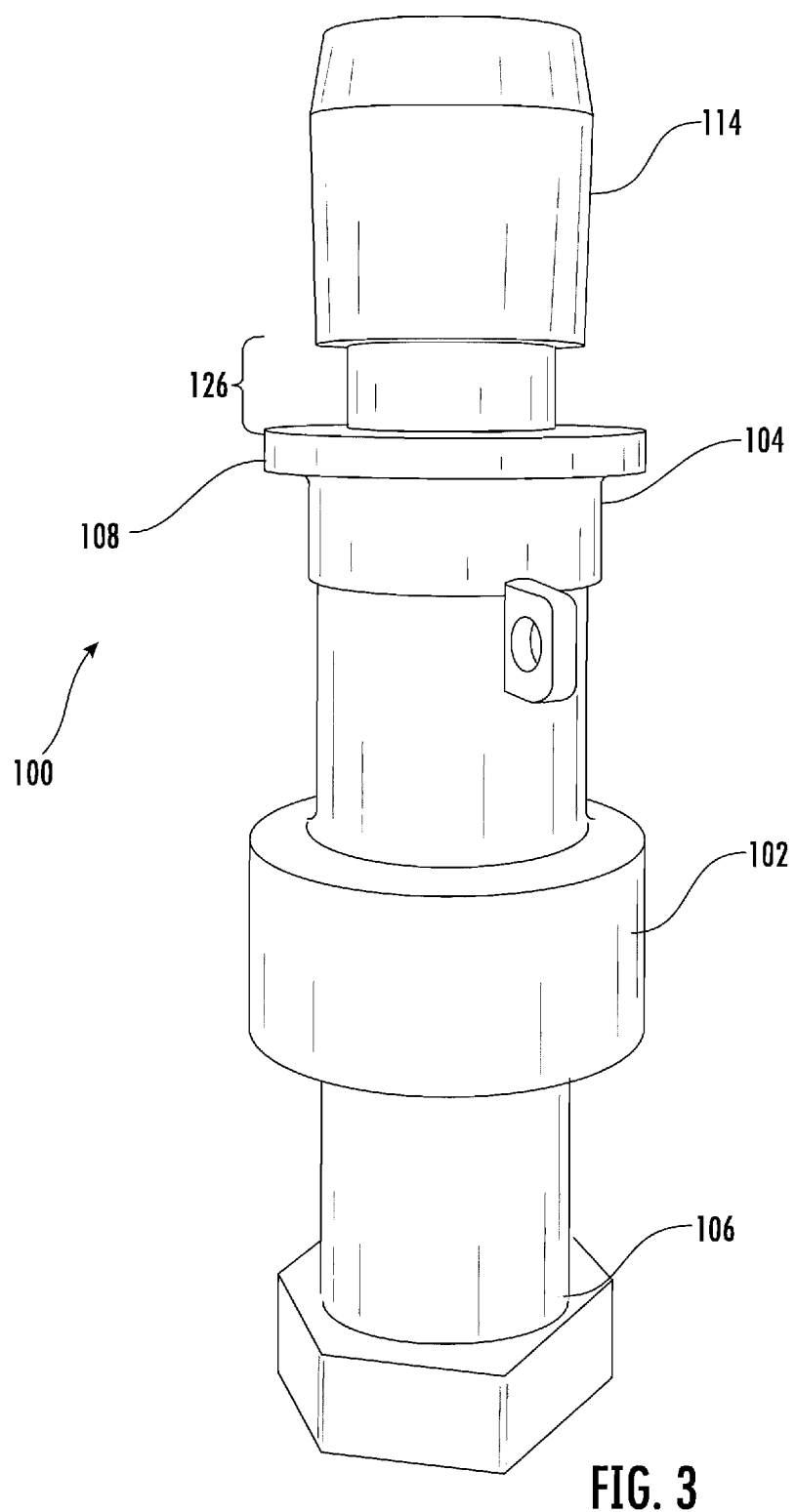
FIG. 3 is an alternative perspective view of the quick coupling valve.
Figure 4:
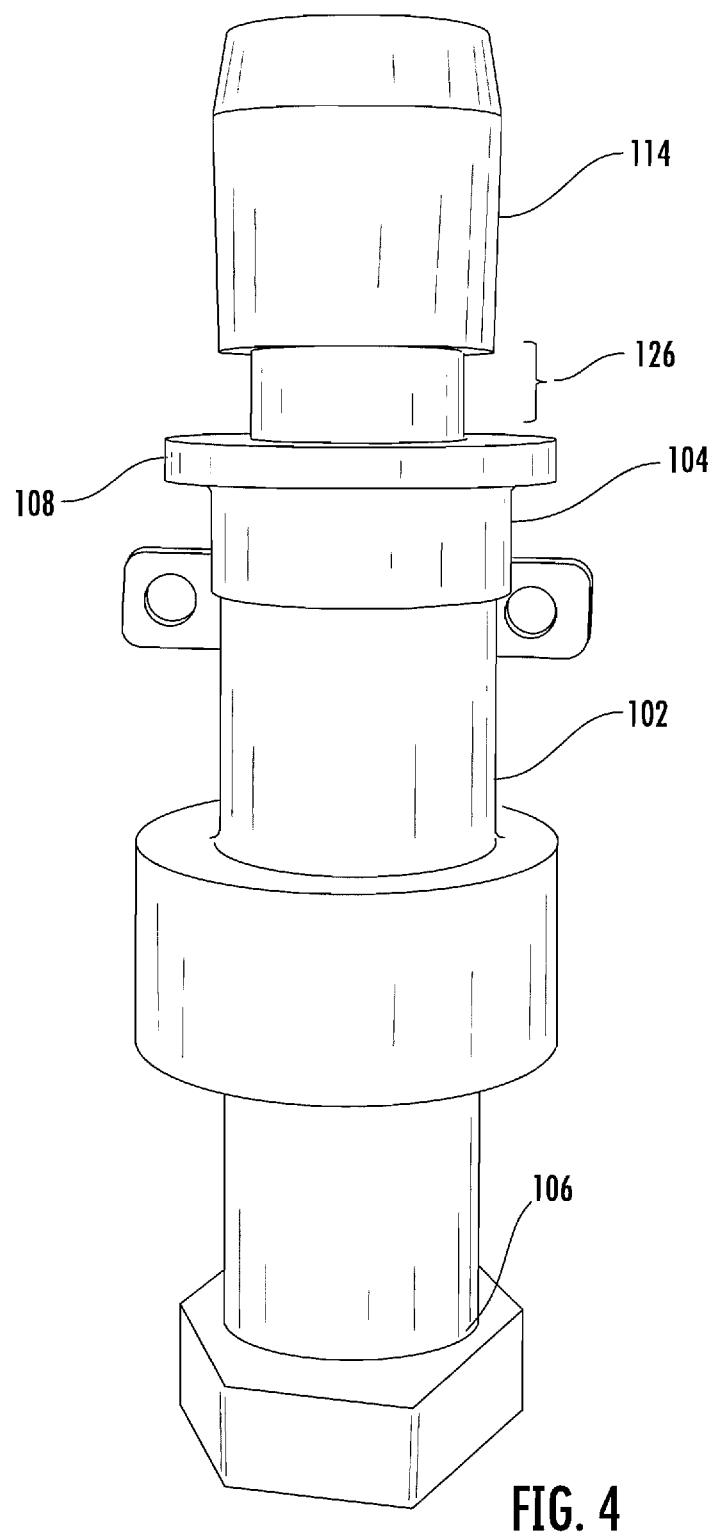
FIG. 4 is a right view of the quick coupling valve.
Figure 5:
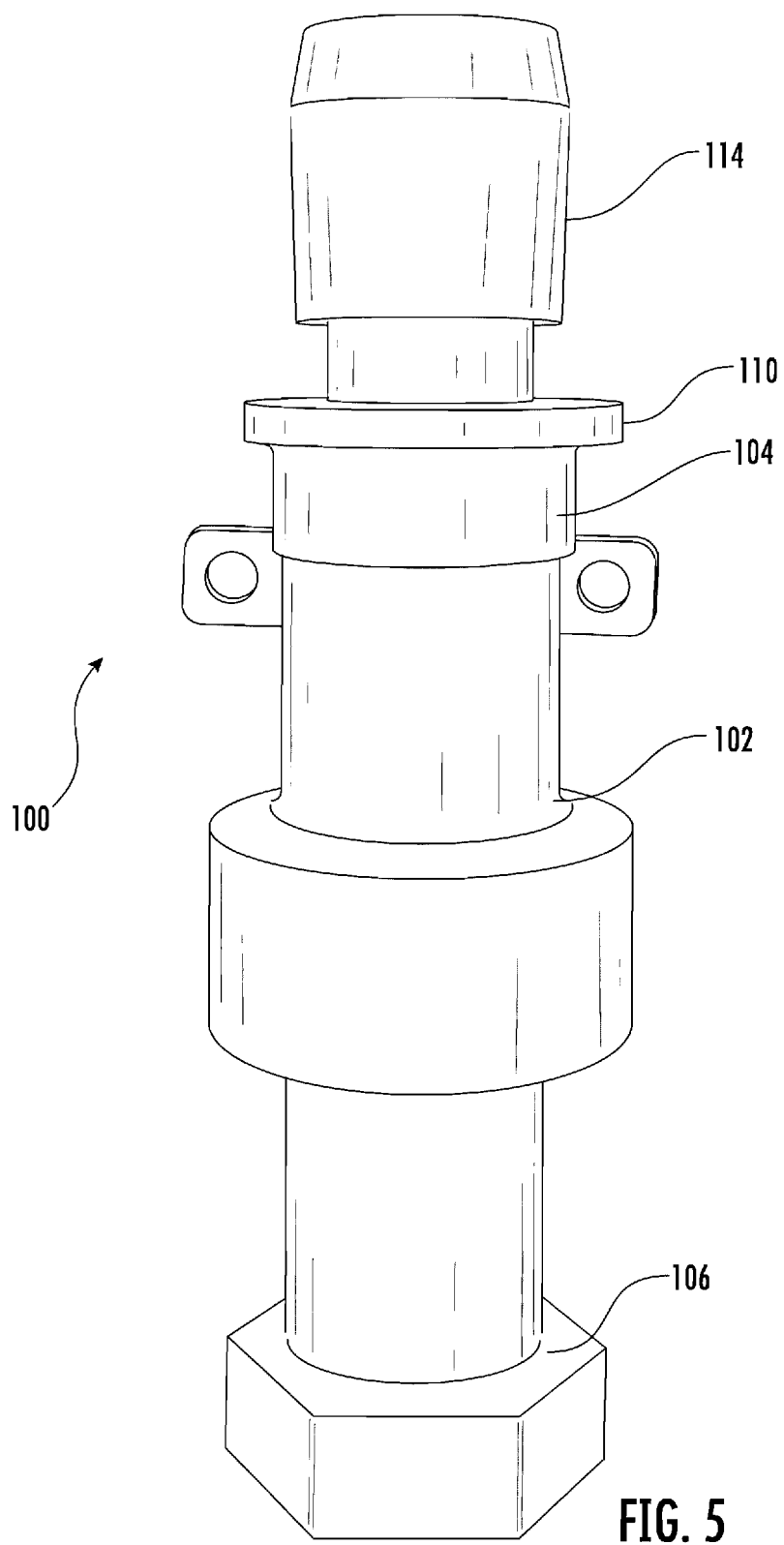
FIG. 5 is a left view of the quick coupling valve.
Figure 6:
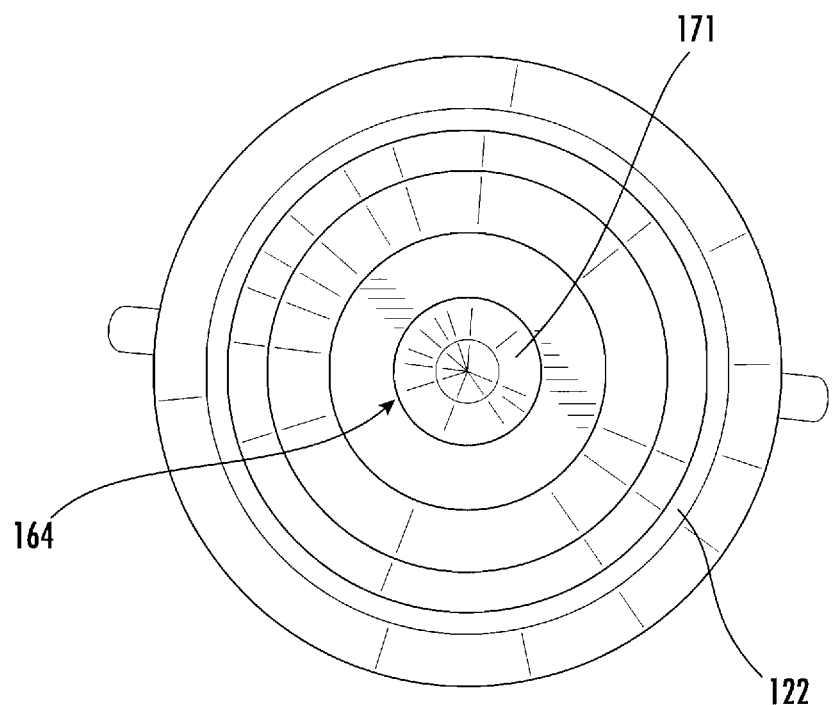
FIG. 6 is a top view of the quick coupling valve.
Figure 7:
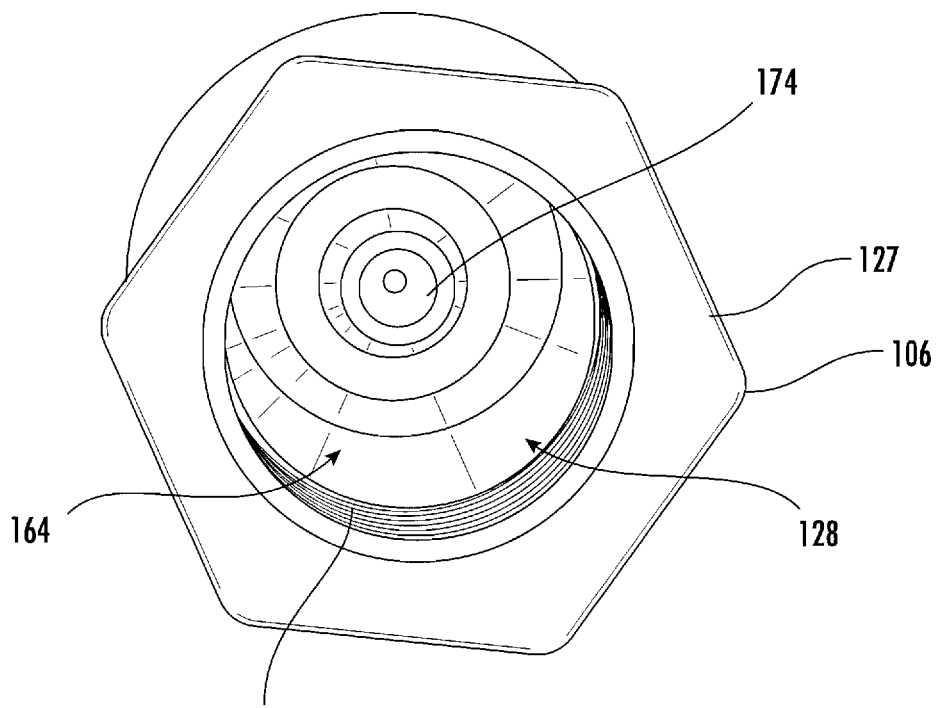
FIG. 7 is a bottom view of the quick coupling valve.

The coupling valve main body second end 106 contains a valve outlet 127 with opening 128. The opening may be threaded 130 to couple to a main water pipe 132 via a service tee 134 and swing joint 136, see FIG. 1D. As shown in FIG. 1D, the quick coupling valve 100 is placed under the ground surface 138, within a housing structure. Stabilizers 142 and crushed aggregate material 144 maintains the positioning of the quick coupling valve 100. In this arrangement, access to the contents of the pipe 132, i.e. water, can be obtained by securing the coupling valve key 200 to quick coupling valve 100 and activating.

Figure 11:
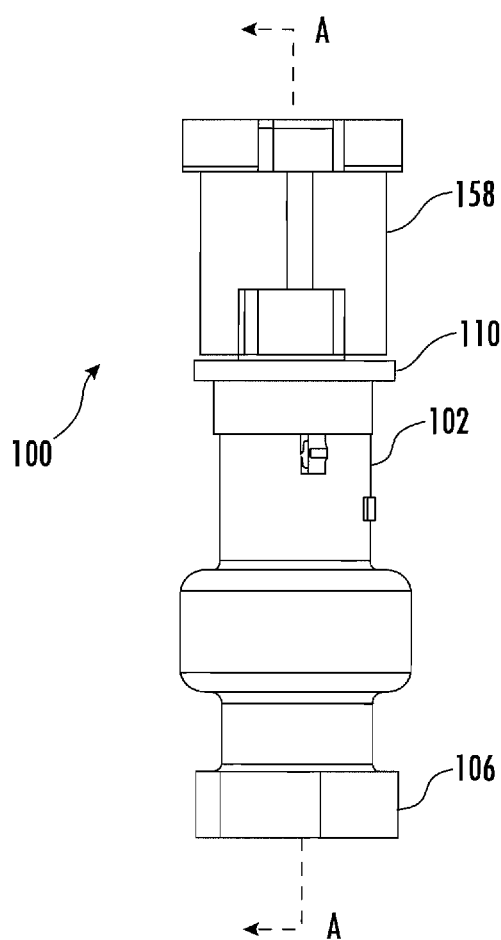
FIG. 11 is a plan view of the quick coupling valve, shown with a cover.

To protect the inner contents of the quick coupling valve 100 from the outdoor elements, debris, or other materials, a cap 146 (see FIGS. 1D, 8, 9 and 10) with a top end 147 and a bottom end 148, may be secured to the main body first end 104. In this placement, the cap bottom surface 150 contacts or engages with the valve key stop upper surface 112, thus covering the valve stem 114. Cap cable 152 secures to the cap 146 at one end, and to the quick coupling valve 100 via eyelet 154 at a second end via clip 156. The quick coupling valve 100 may use a lockable cap 158, see FIG. 11, in which the cap can be locked in place.

Figure 12:
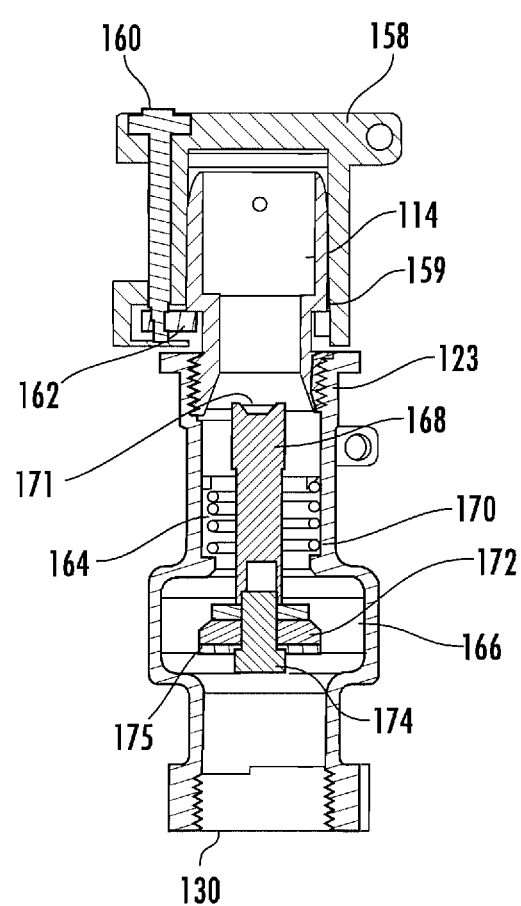
FIG. 12 is a cross sectional view of the quick coupling valve, shown with a cover, taken along lines A-A in FIG. 11.
Figure 13:
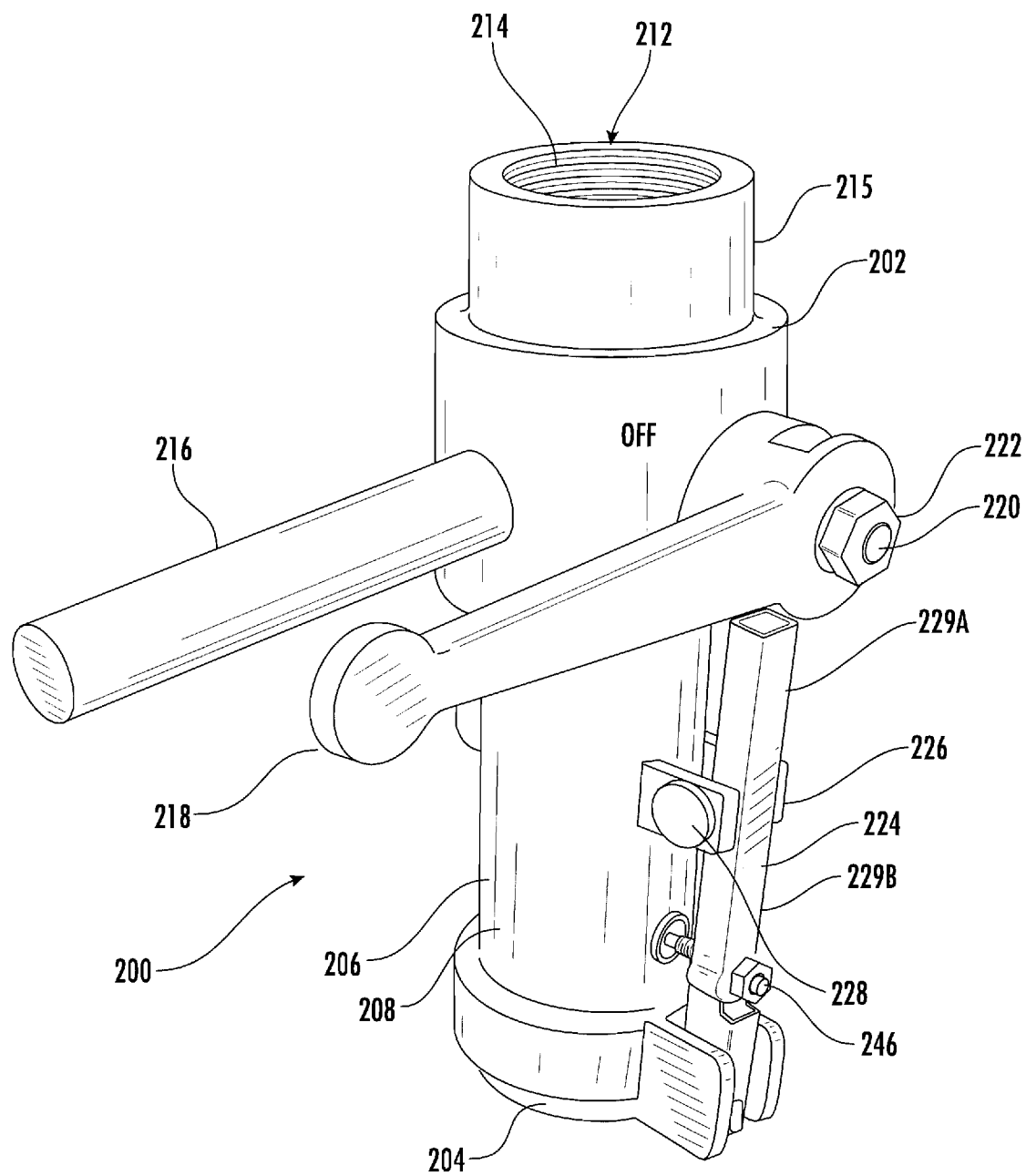
FIG. 13 is a perspective view of an illustrative embodiment of a quick coupling valve key.
Figure 14:
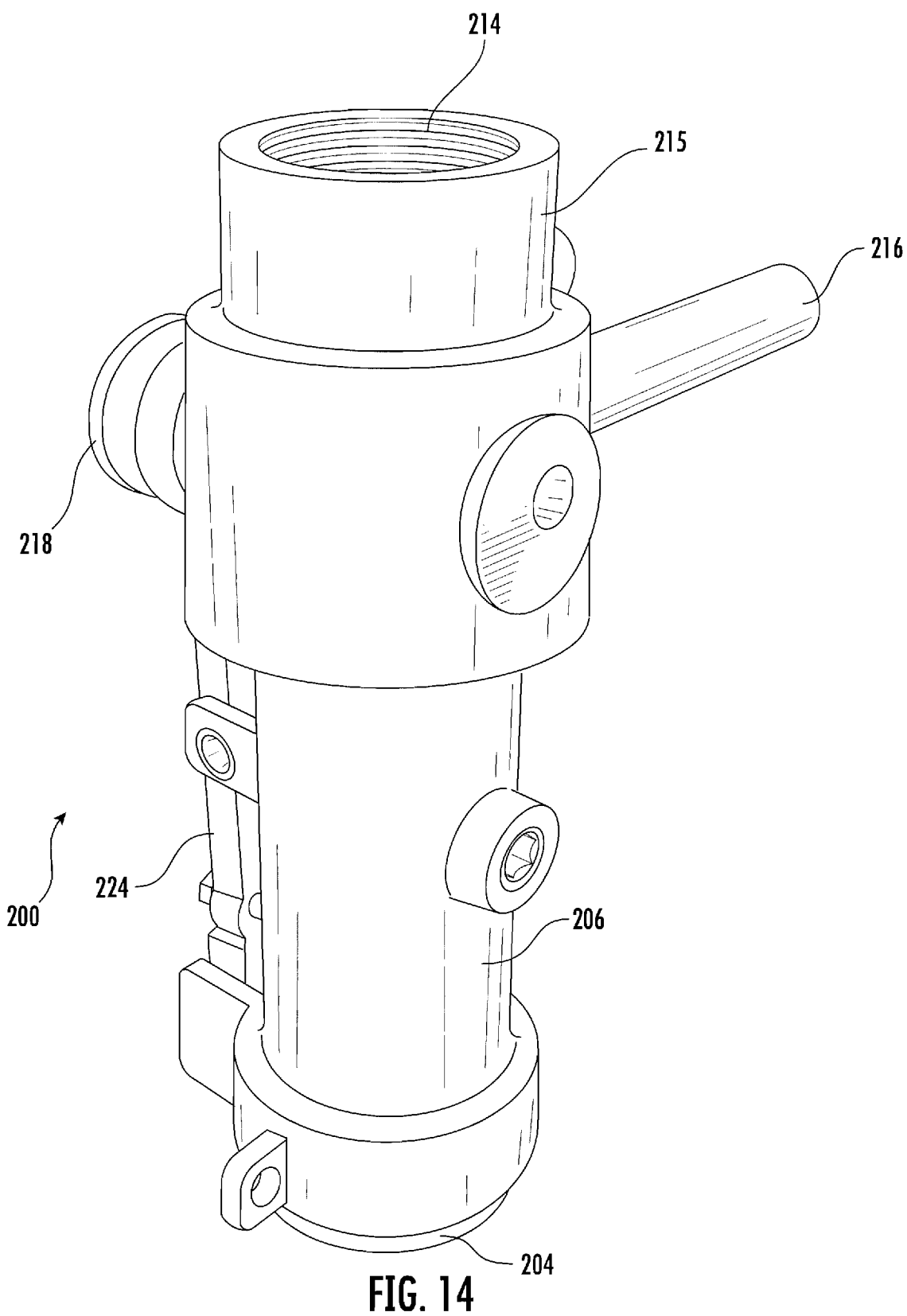
FIG. 14 is an alternative perspective view of the quick coupling valve key.
Figure 15:
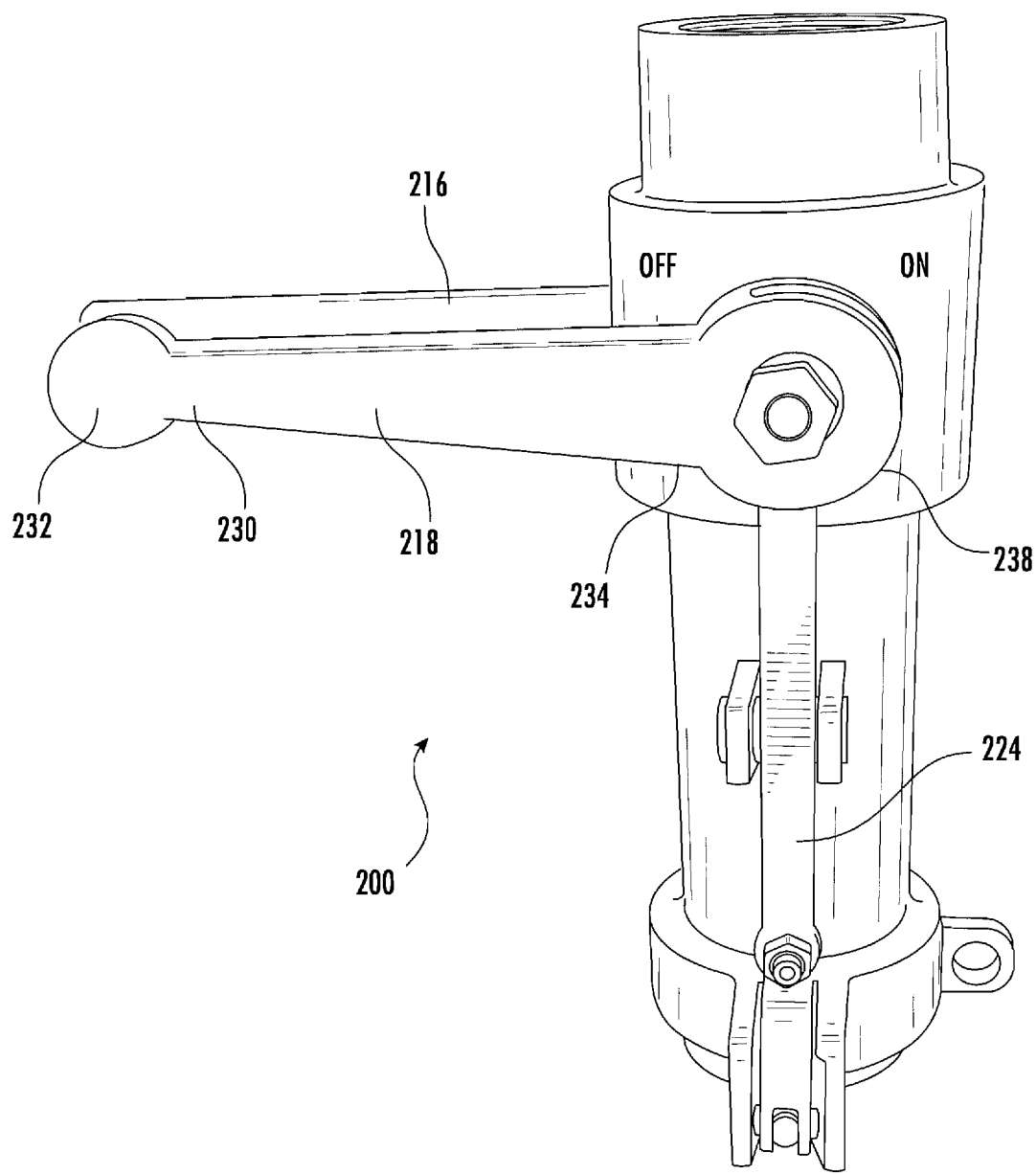
FIG. 15 is a right view of the quick coupling valve key.
Figure 16:
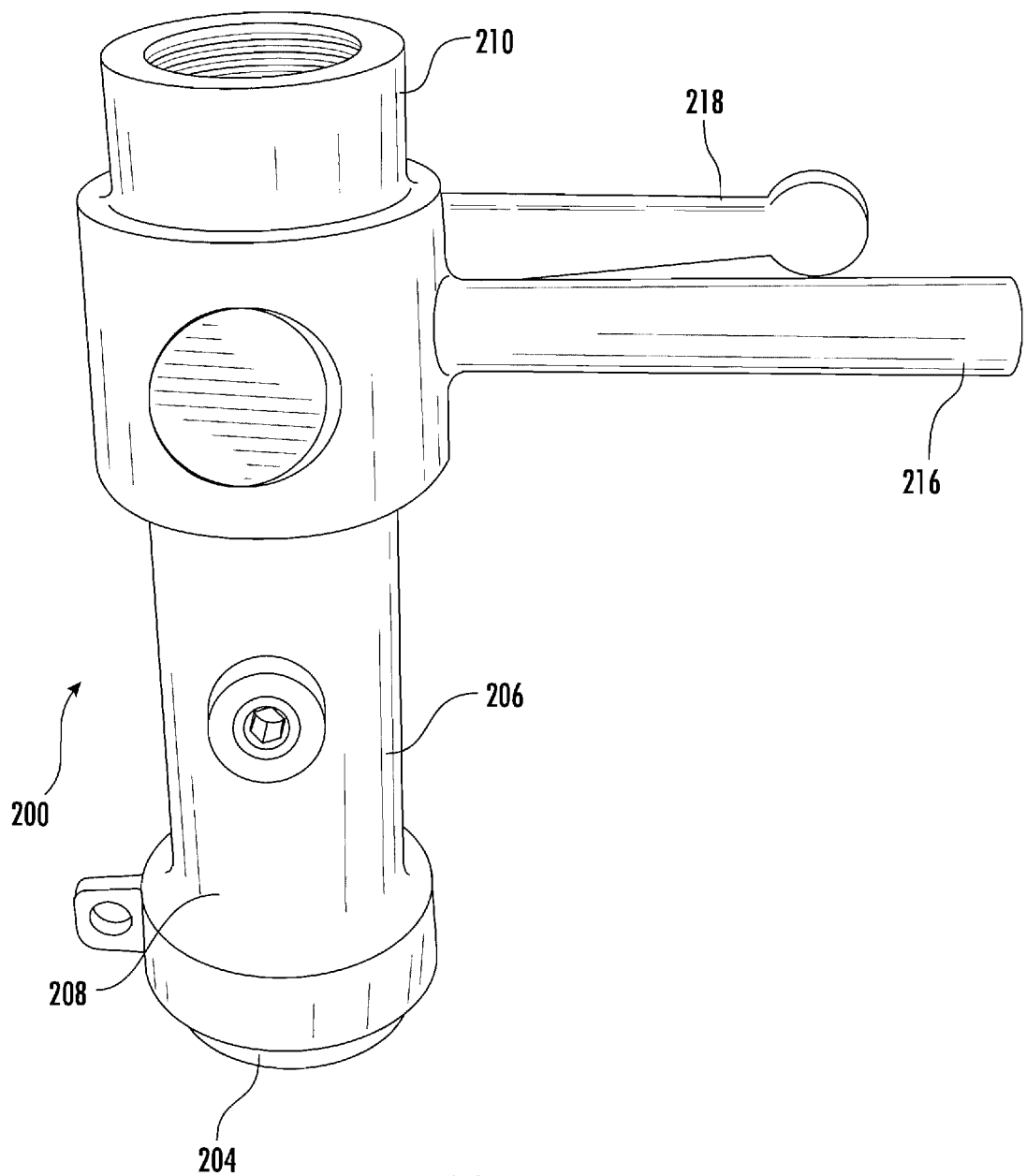
FIG. 16 is a left view of the quick coupling valve key.
Figure 17:
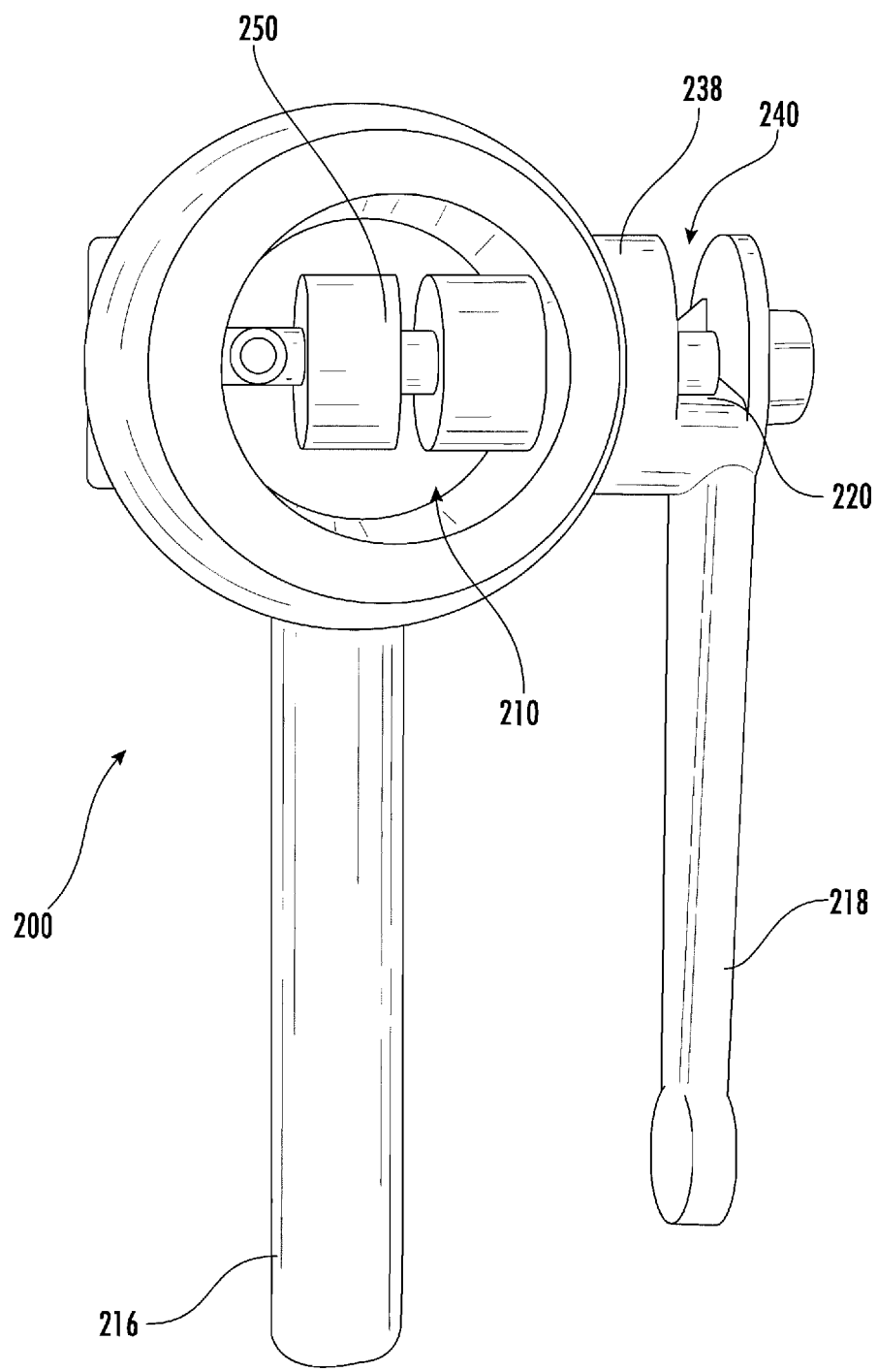
FIG. 17 is a top view of the quick coupling valve key.

FIG. 12 is a cross sectional view of the quick coupling valve 100 with a locking cap 158, illustrating the internal components. The locking cap 158 has a valve cover body 159 and is sized and shaped to cover the valve stem 114. The locking cap 158 includes a cap lock 160 and cap latch 162. The quick coupling valve 100 is configured to receive at least one component associated with the coupling valve key 200, which, upon contact or engagement, allows flow of fluid, i.e. water, from a main fluid source, i.e. the main water pipe 132. The quick coupling valve 100 comprises an interior 164 (see also FIGS. 6 and 7), forming a fluid flow channel 166. The interior 164 includes a spring-loaded valve push pin shaft 168 with spring 170. The valve push pin shaft 168 may include a key push pin shaft receiving surface 171, see FIG. 6, sized and shaped to receive a key push pin shaft (to be described later). Secured to the valve push pin shaft 168 are a seat 172, bolt 174 and washer 175.

Referring to FIGS. 13-24, an illustrative example of the quick coupling valve key 200 is shown. The quick coupling valve key 200 is configured to quickly and easily connect, engage with, or secure to the quick coupling valve 100 in a manner that: 1) does so at any 360 degree orientation, 2) does not require specific alignment using studs or notches; 3) locks when connected, engaged with or secured to the quick coupling valve 100 in any direction, 4) locks when connected, engaged with or secured to the quick coupling valve 100 prior to water flowing, to thus minimize or prevent water leakage when first manipulated, and 5) locking is performed without turning or screwing of the quick coupling valve key into the quick coupling valve. The quick coupling valve key 200 is configured, using a single lever with multiple cams, to lock to and engage with the coupling valve 100 to cause fluid flow.

The quick coupling valve key 200 comprises a first end 202 configured to engage with or secure to the swivel 300 (described below) or other threaded water flow devices, i.e. sprinklers, a second opposing end 204 configured for engaging or contacting with the coupling valve 100, and a main body 206 therebetween having a continuous outer wall 208. The continuous outer wall 208 is shown in a generally cylindrical shape; however, such shape is not limiting and is illustrative only. The quick coupling valve key main body 206 contains an interior 210, see FIG. 17, which contains several interior components that drive the quick coupling valve key functionality. The first end 202 includes a coupling valve key 210 having an opening 212, and internal threading 214.

Attached to the continuous outer wall 208 is a handle 216, illustrated as an elongated member extending outwardly away from the quick coupling valve key main body 206. Lever arm 218 provides a mechanism for a user to switch between an "ON" or "OFF", or a "Locked" or "Unlocked", position. The lever arm 218 is secured to the valve key main body 206 via a lever connector bolt or pin 220 and lever arm nut 222. Upon activation, i.e. moving the lever to the "ON" or "OFF" position, lever arm 218 engages or interacts with a key locking member 224, illustrated herein as an elongated pin arm, held in place via a locking pin arm bracket 226 and locking pin arm pin 228. Activation, i.e. the motion of the lever arm 218 is ninety (90) degrees different to the threaded of the coupling valve 100 into a service tee. In this manner, the action of the lever arm 218 cannot unscrew or loosen the coupling valve 100 the swing joint 136 stresses. The locking pin arm bracket 226 and locking pin arm pin 228 separate the key locking member 224 into an upper key locking member portion 229A and a lower key locking member portion 229B.

Figure 18:
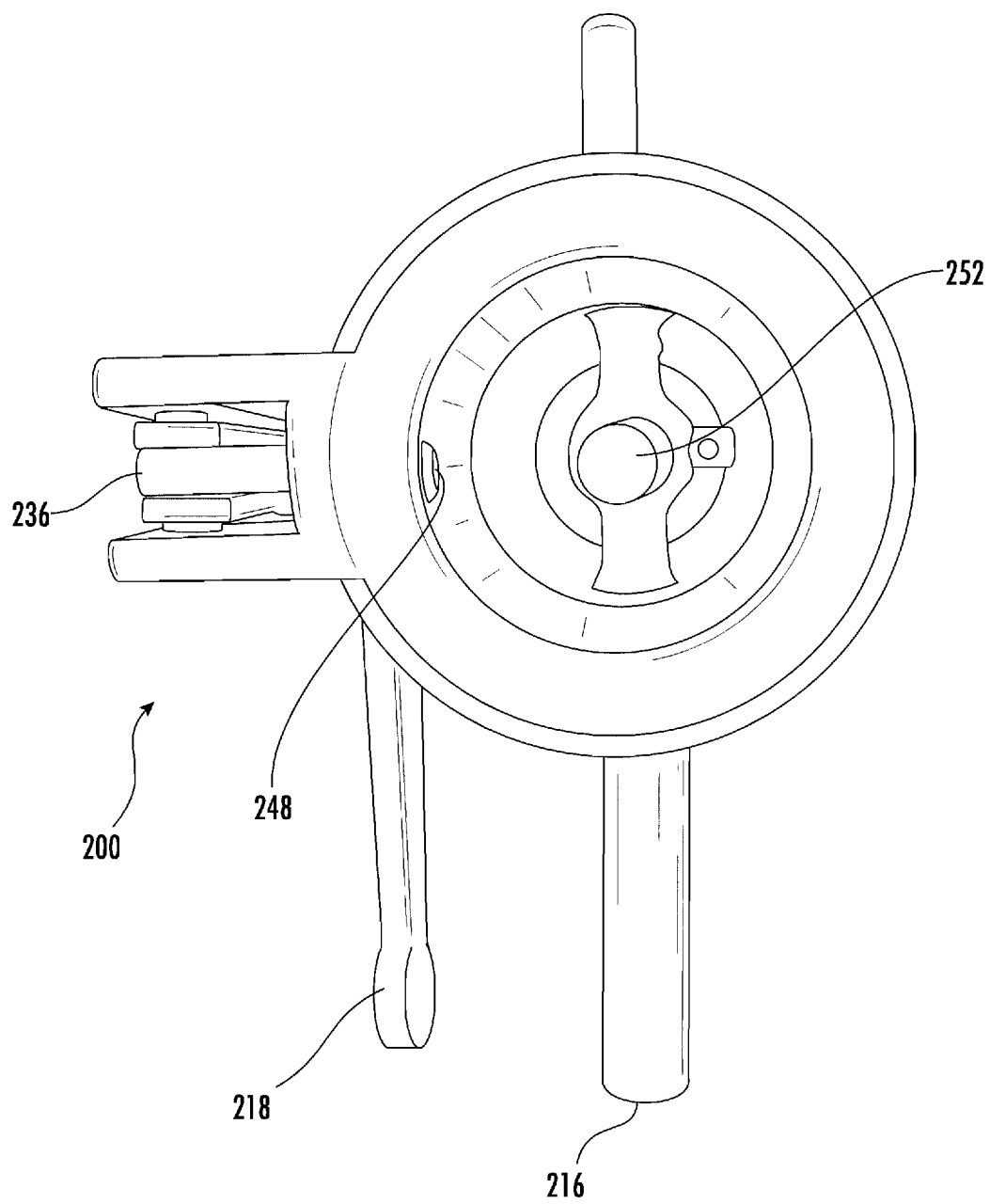
FIG. 18 is a bottom view of the quick coupling valve key, shown in the "OFF" position.
Figure 19:
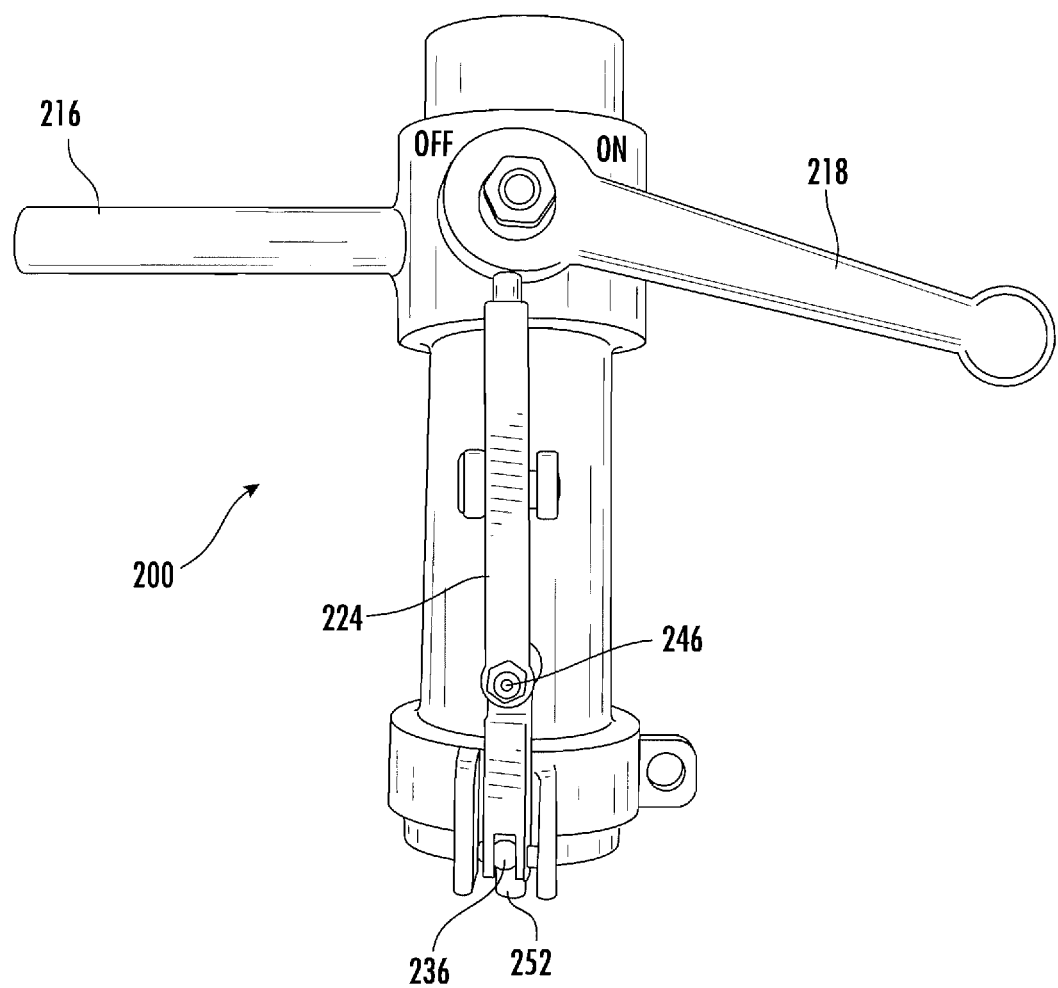
FIG. 19 is an alternative perspective view of the quick coupling valve key, shown in the "ON" position.

The lever arm 218 comprises a first end 230 terminating in a generally planer and rounded surface 232, and a second opposing end 234 configured to interact with the elongated pin arm 228, thereby engaging or disengaging a key to valve locking member 236, see FIG. 18. The lever arm second opposing end 234 comprises a cylindrical portion 238 having a channel 240. The size or width of the channel 240 is sufficient to allow the channel 240 to move about a key locking member to lever arm engaging member 242, illustrated herein as an elongated pin-like member extending from the elongated pin arm 228. While the quick coupling valve key 200 is illustrated using a single key to valve locking member 236, two or more key to valve locking members 236 may be used as well without departing.

A ramped surface 244 pushes against the key locking member to lever arm engaging member 242 as the lever arm 218 is rotated. This action causes key locking member to lever arm engaging member 242 and the upper key locking member portion 229A to move away from the quick coupling valve key main body 206 as the lower key locking member portion 229B and the key to valve locking member 236 move inwardly towards the quick coupling valve key main body 206. Screw 246 helps maintain the key locking member 224 positioning. As the lever arm 218 is rotated to the "ON" position, the key to valve locking member 236 moves linearly through an opening 248 (see FIG. 18) in the continuous outer wall 208, allowing the key to valve locking member 236 to move into the quick coupling valve key main body interior 210.

The quick coupling valve key main body interior 210 houses several components that drive functionality. A cam 250 is coupled or secured to a key push pin shaft 252 (with spring 253). As a user manipulates the lever arm 218 to the "ON" (or "OFF") position, the lever connector bolt or pin 220 rotates the cam 250, causing the key push pin shaft 252 to move in a linear manner downwardly ("ON" position) or upwardly ("OFF" position) relative to a longitudinal axis 254. While the quick coupling valve key 200 is illustrated using a single lever 218 with a single key push pin shaft 252, two or more lever arms 218 or key push pin shaft 252 may be used as well.

In the "ON" position, movement of the key push pin shaft 252 results in contacting and moving the valve push pin shaft 168. This movement ultimately results in fluid flow through the quick coupling valve key 200, and the quick coupling valve 100 as well. As the key push pin shaft 252 contacts and moves the valve push pin shaft 168, the key to valve locking member 236 engages or contacts the locking slot 126. The quick coupling valve key 200 is configured so that, as the key push pin shaft 252 moves, the key to valve locking member 236 is moved in place prior to the key push pin shaft 252 being moved to its end position.

When the quick coupling valve key 200 is inserted and locked into the quick coupling valve 100, no turning or screwing action is required by the user. Rotation of the handle is the only motion required. In addition, the rotation of the handle motion is in a different plane from that of the threads in the bottom of the quick coupling valve 100 and the swing joint 136. As a result, there is no, or at least minimal stress or potential for unscrewing or damaging the connection of the quick coupling valve 100 to the swing joint 136. Since the quick coupling valve 100 to the swing joint 136 connection is under pressure, compromise to this connection or blowout could result in injury to the person screwing the quick coupling valve key 200 into the quick coupling valve 100. Such injury could be the result of the quick coupling valve key 200, the quick coupling valve 100, or both, being launched as a projectile in the direction of the user.

Figure 20:
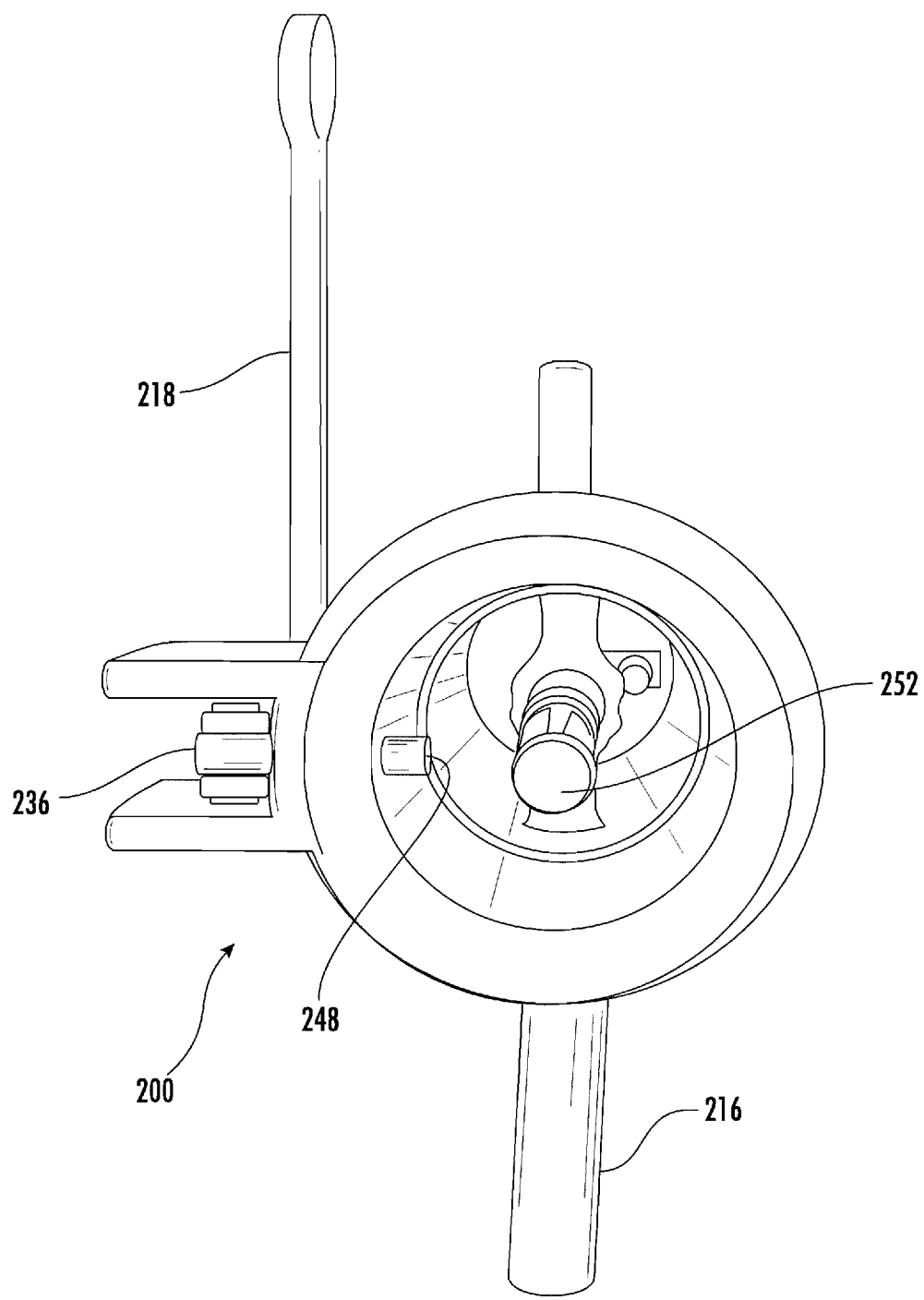
FIG. 20 is a bottom view of the quick coupling valve key, shown in the "ON" position.
Figure 21:
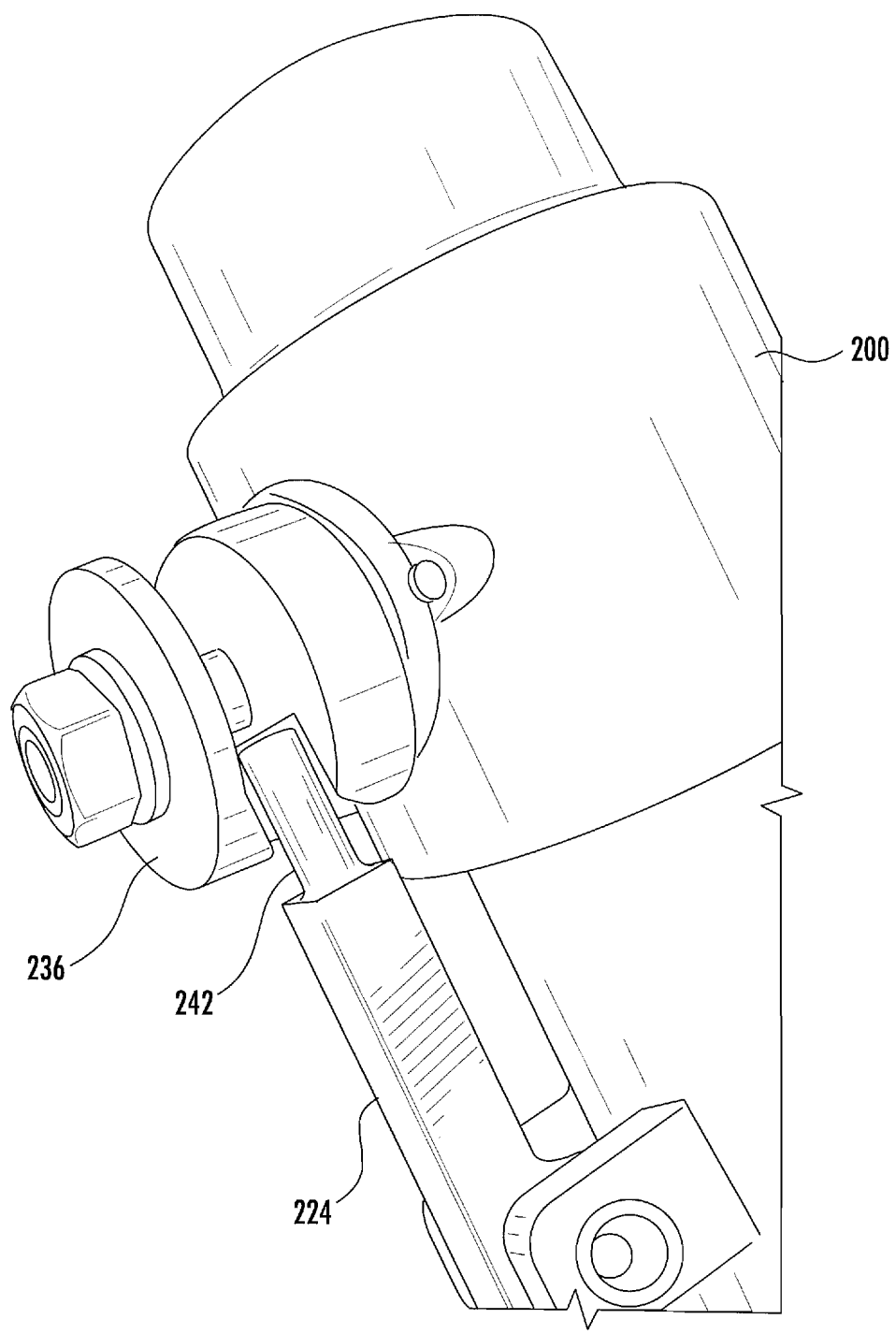
FIG. 21 is a partial view of the quick coupling valve key, illustrating a portion of a lever and key locking member.
Figure 22:
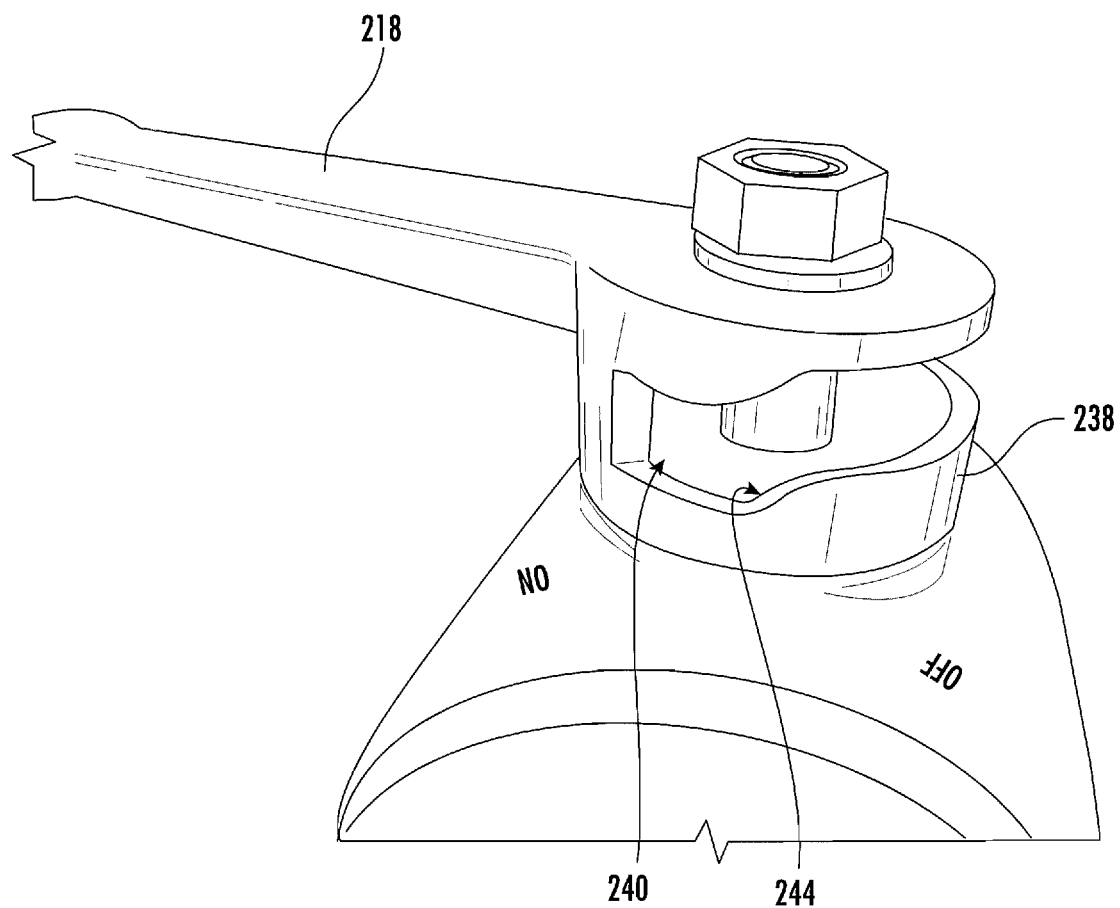
FIG. 22 is a close-up view of a portion of the lever.
Figure 23:
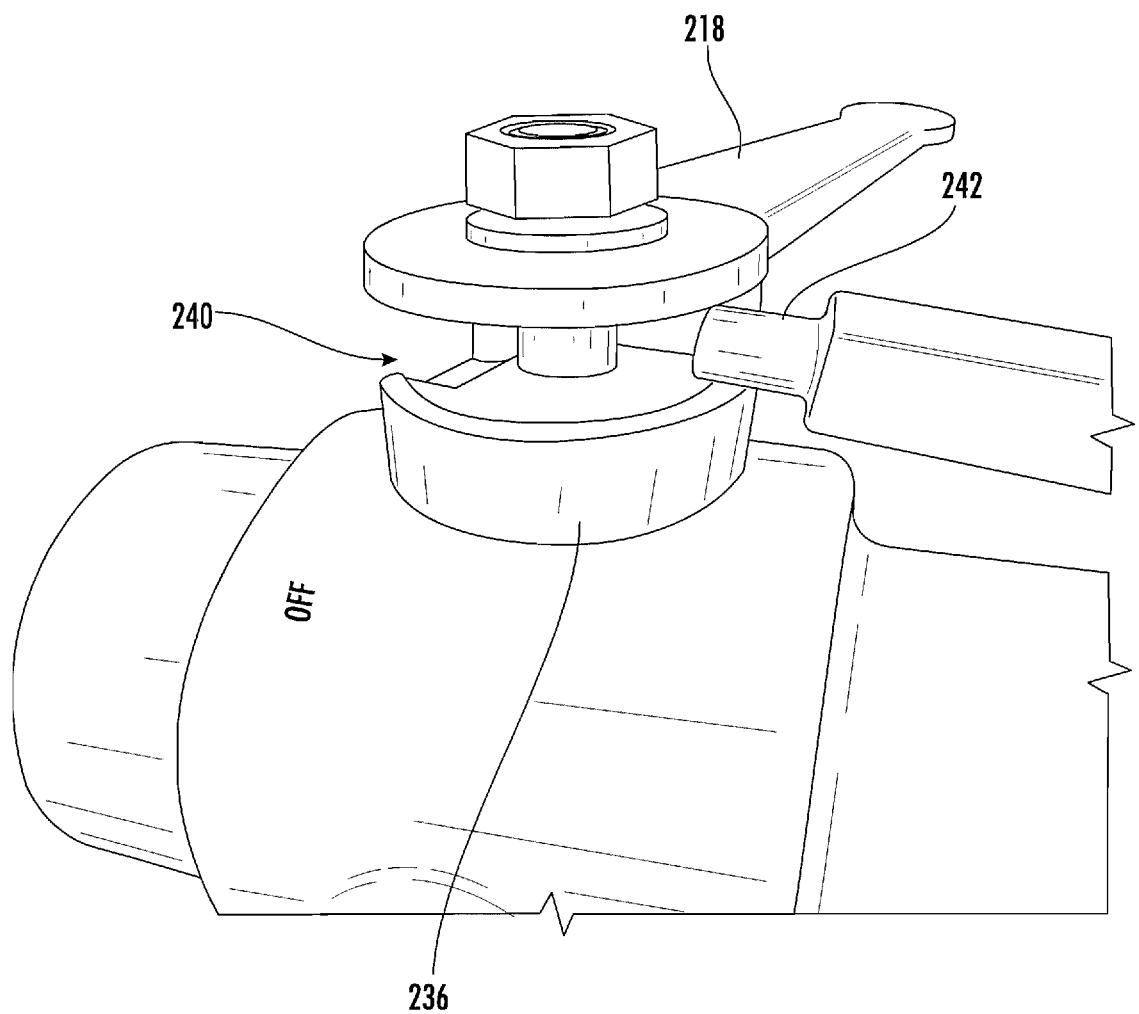
FIG. 23 is an alternative view of the portion of the lever illustrated in FIG. 22.
Figure 24:
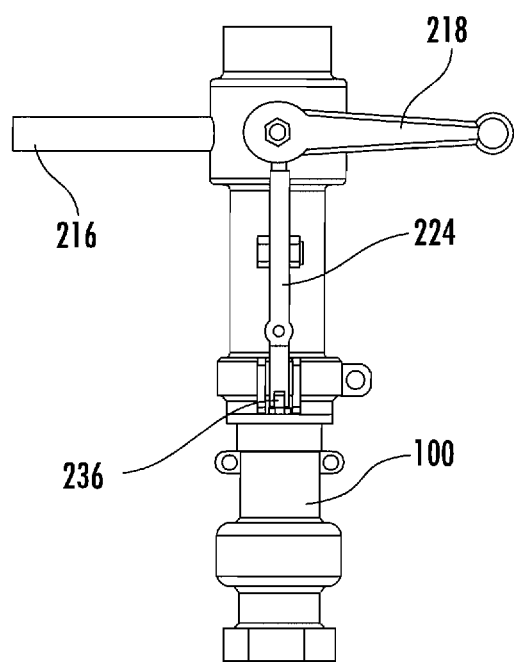
FIG. 24 illustrates the coupling of the quick coupling valve and quick coupling valve key.
Figure 25:
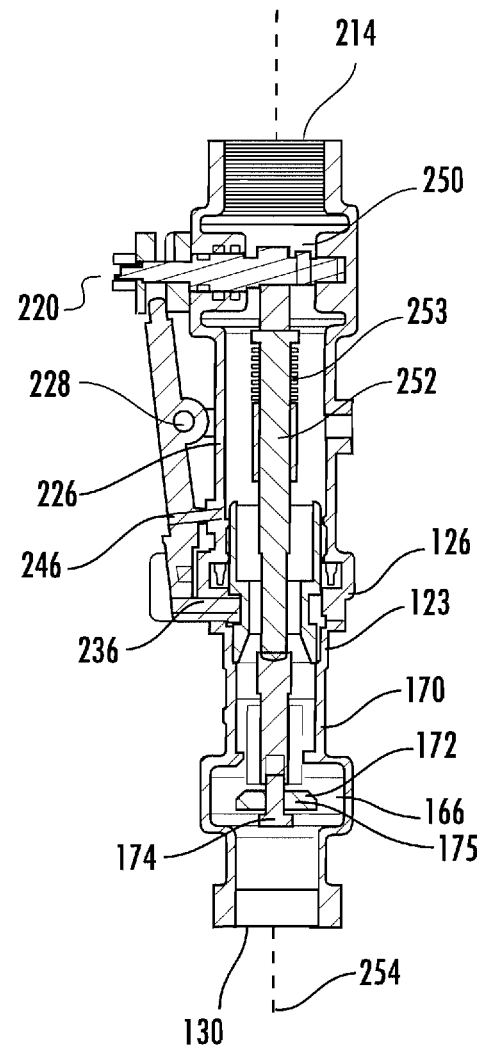
FIG. 25 is a cross sectional view of the quick coupling valve coupled to the quick coupling valve key.
Figure 26:
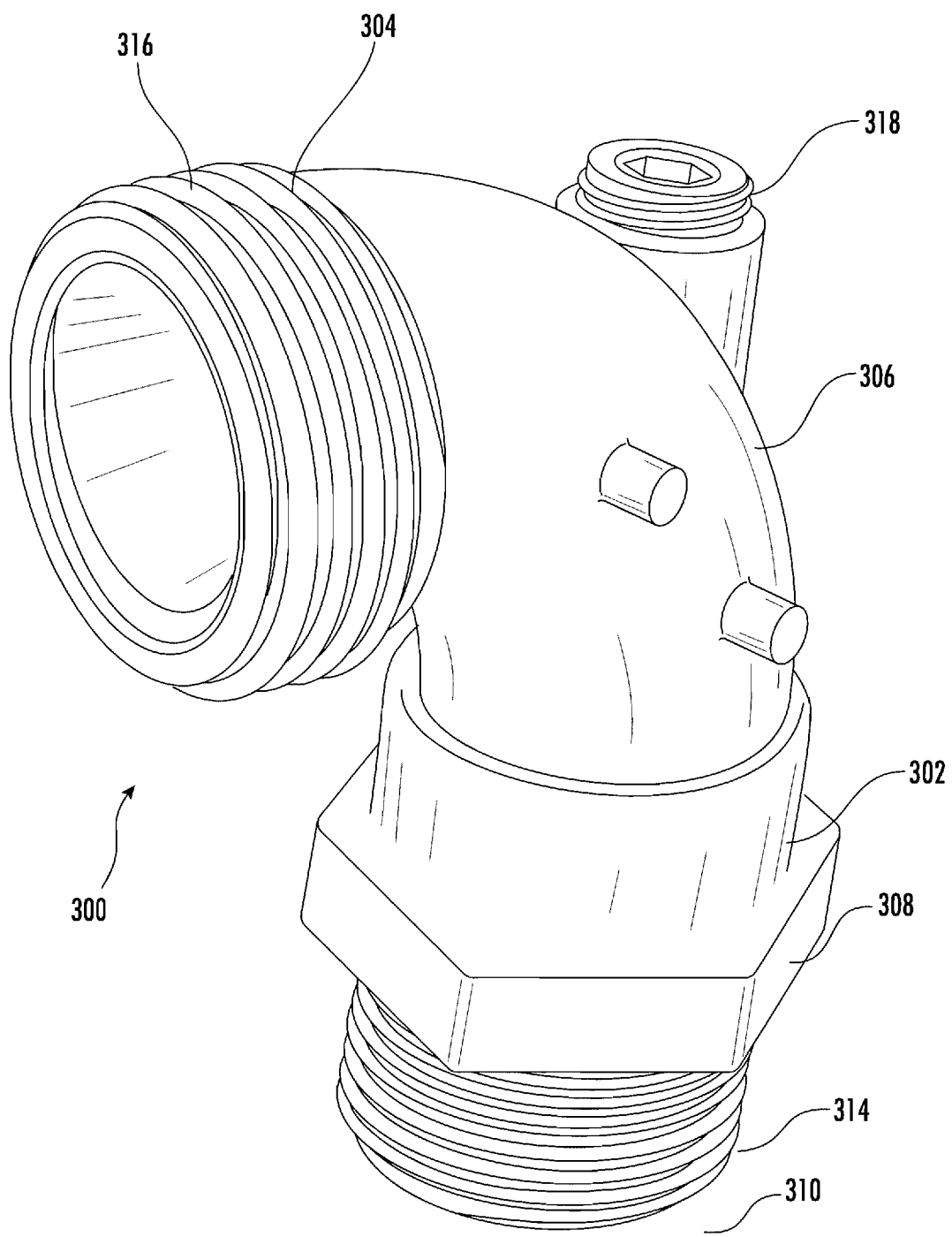
FIG. 26 is a perspective view of an illustrative embodiment of a coupling valve swivel.
Figure 27:
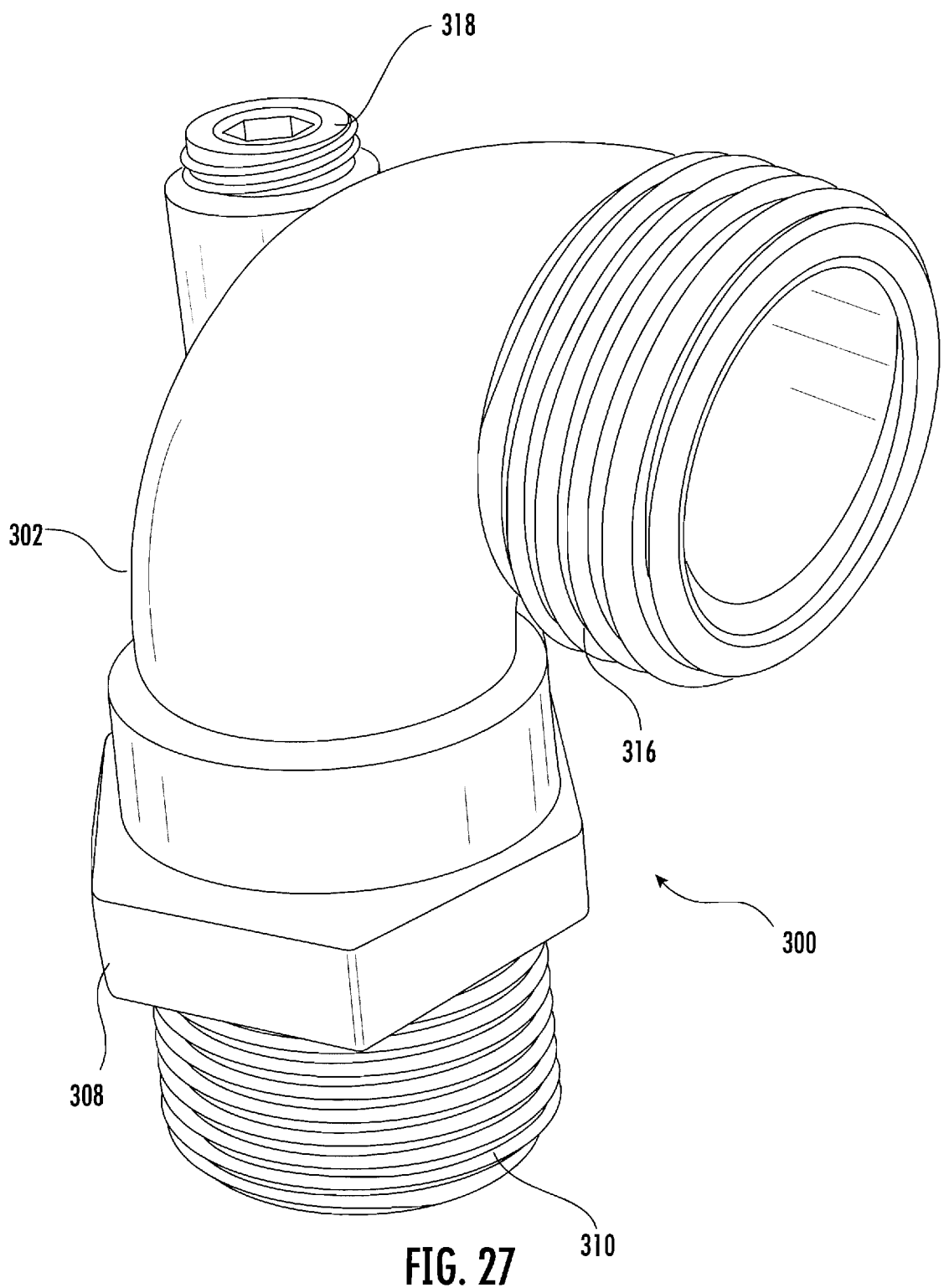
FIG. 27 is an alternative perspective view of the coupling valve swivel.
Figure 28:
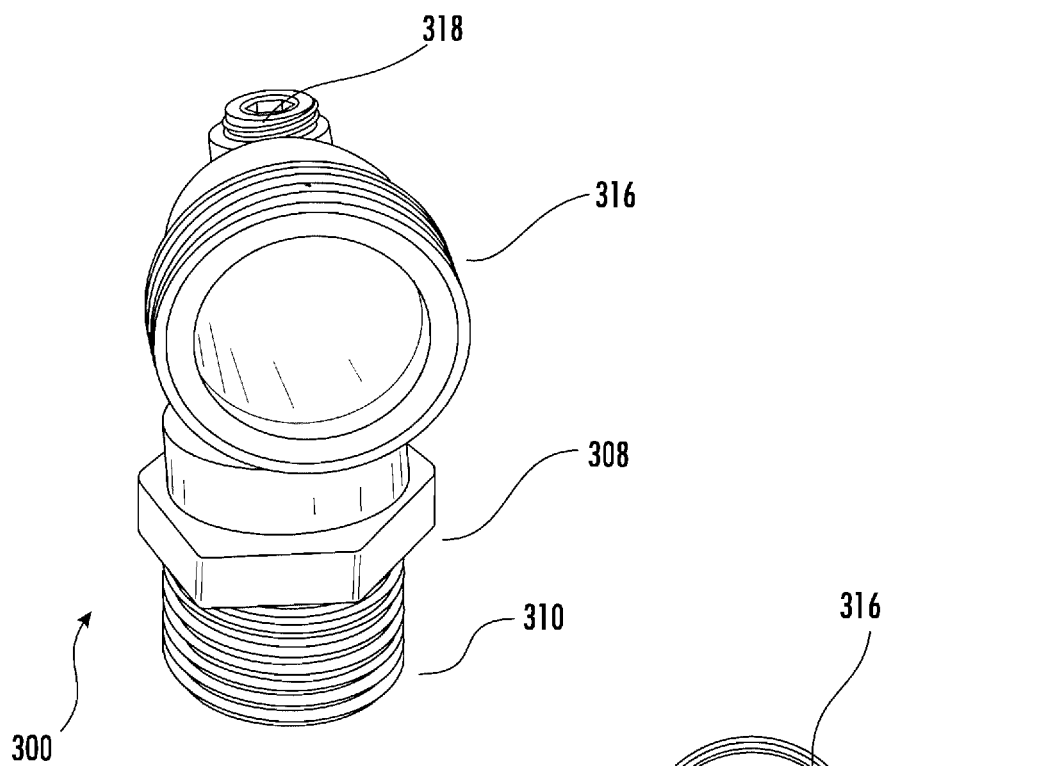
FIG. 28 is a front view of the coupling valve swivel.
Figure 29:
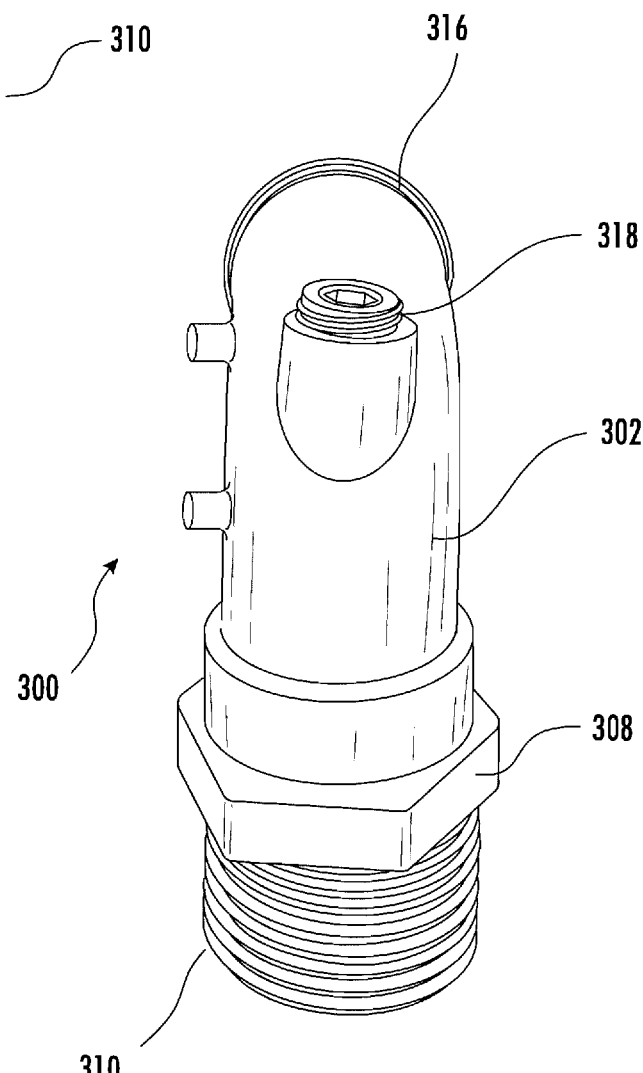
FIG. 29 is a back view of the coupling valve swivel.
Figure 30:
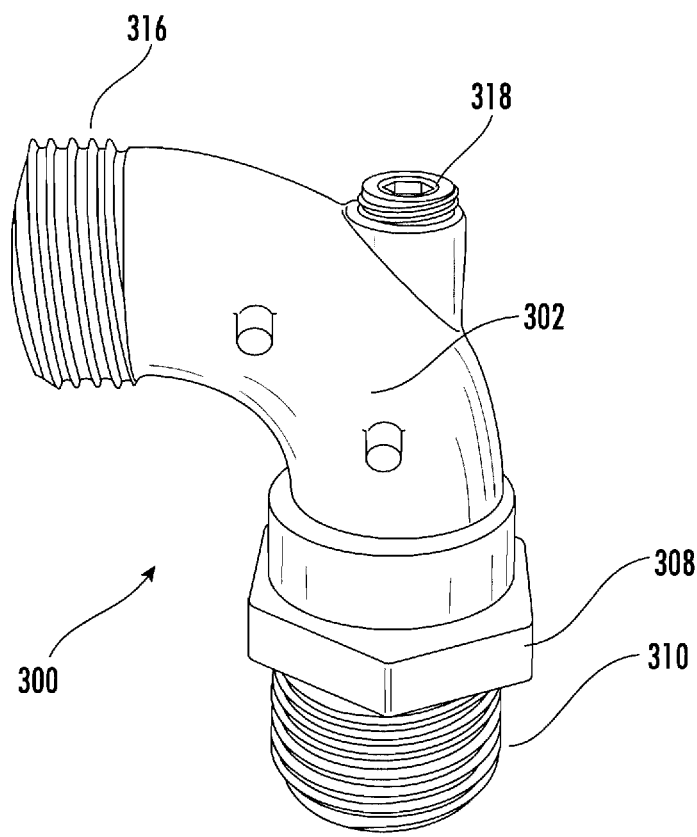
FIG. 30 is a right view of the coupling valve swivel.
Figure 31:
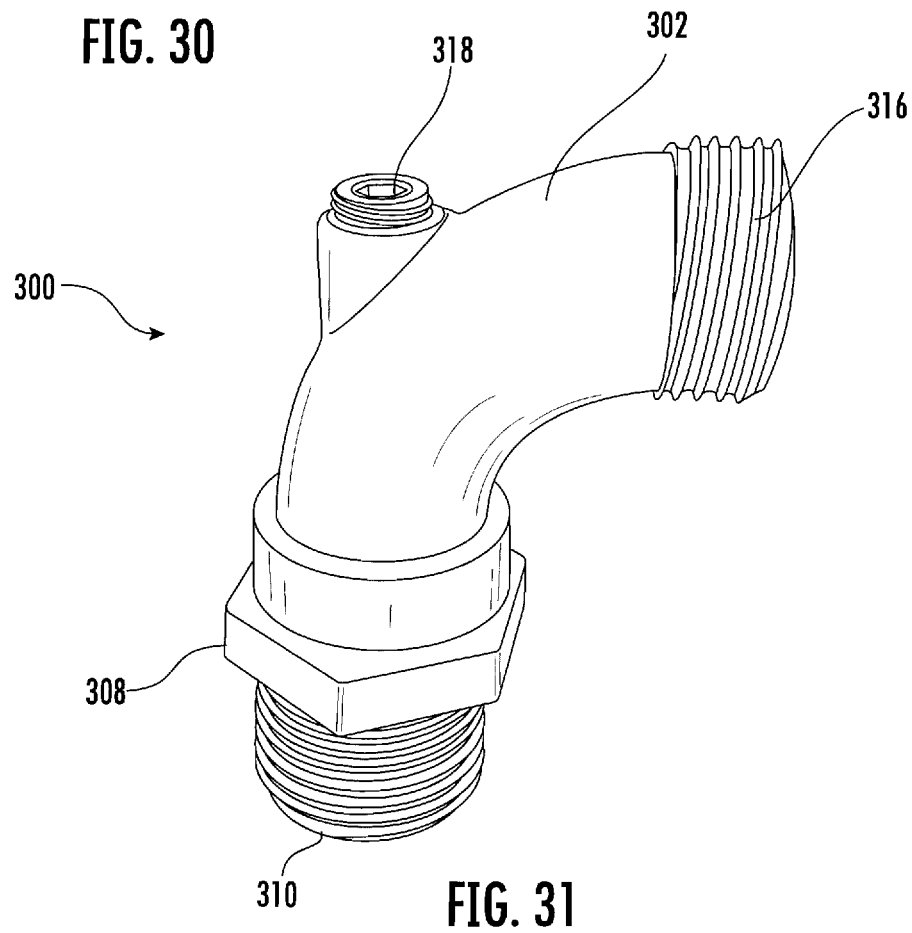
FIG. 31 is a left view of the coupling valve swivel.
Figure 32:
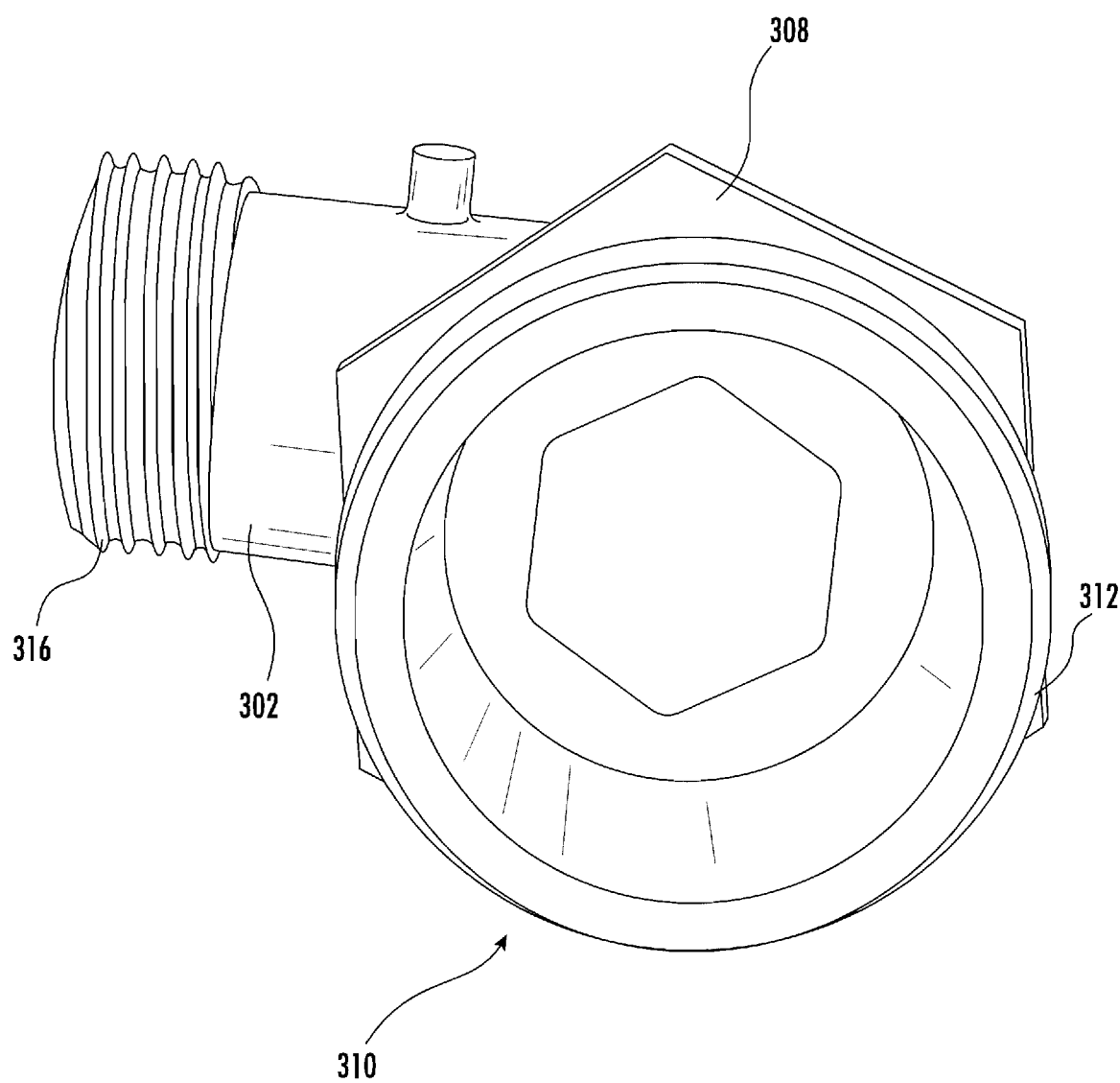
FIG. 32 is a bottom view of the coupling valve swivel.
Figure 33:
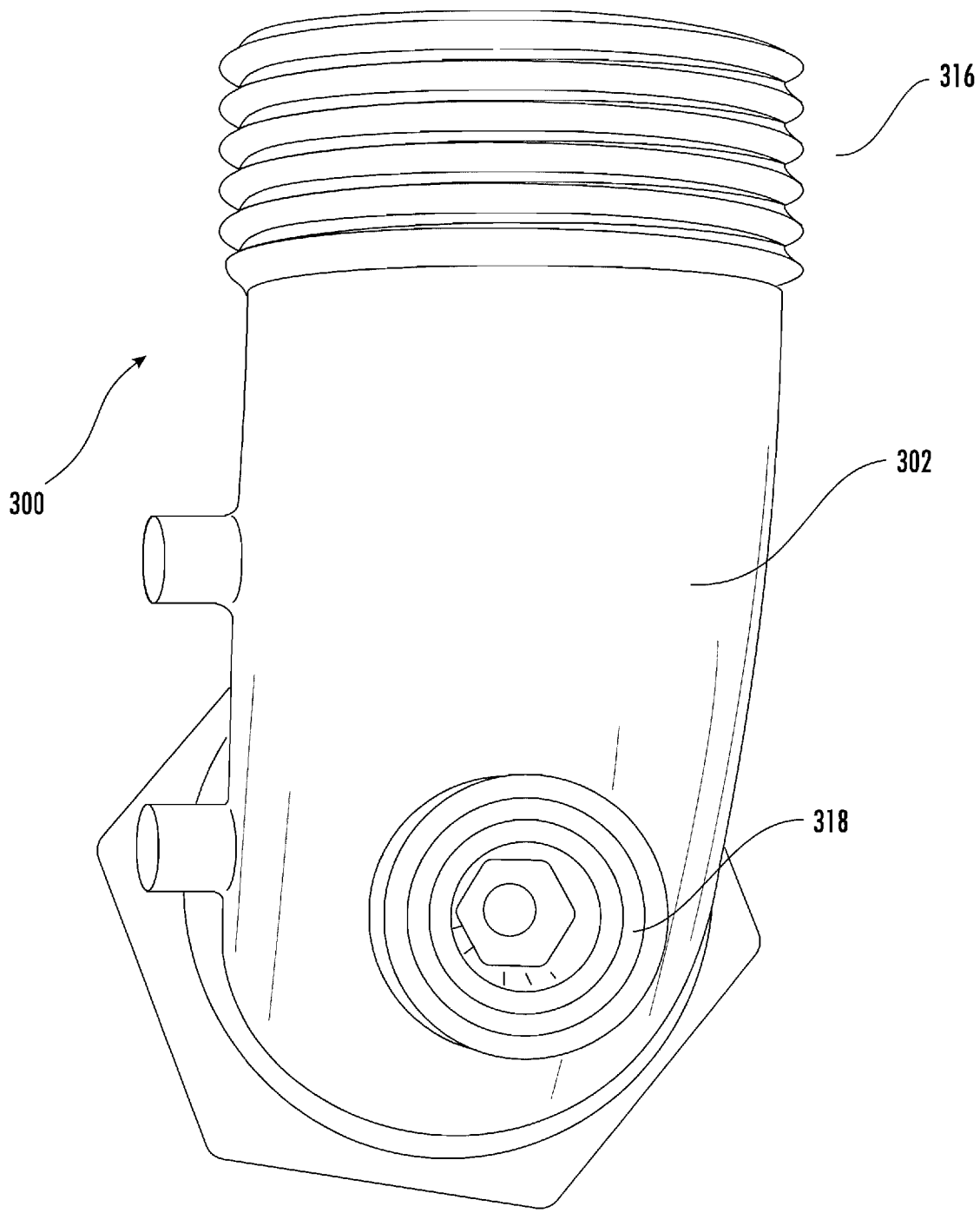
FIG. 33 is a top view of the coupling valve swivel.

FIG. 18 illustrates the quick coupling valve key 200 in the "OFF" position, with the key to valve locking member 236 and the key push pin shaft 252 in a retracted or non-activated position (prior to or above the position of the key to valve locking member 236). FIG. 20 illustrates the quick coupling valve key 200 in the "ON" position, with the key to valve locking member 236 extending into the interior 210 and the key push pin shaft 252 extended or placed in the downward position (past or below the position of the key to valve locking member 236).

Referring to FIGS. 26-33, an illustrative embodiment of the swivel 300 is shown. While swivel 300 is shown as part of the system 10, swivel 300 may be replaced with other devices, preferably threaded devices, which may be secured to quick coupling valve key 200 to dispense water. The swivel 300 comprises a first end 302, a second end 304, and a swivel main body 306. The first end 302 comprises a wrench plate 308 and an inlet 310 with opening 312 (see FIG. 32) and external threading 314. The external treading 314 is configured to cooperate with quick coupling valve key threading 214 to couple or secure the swivel 300 to the quick coupling valve key 200. The second end 304 also contains external threading 316. The external threading 316 is configured to engage or couple with threading associated with a fluid dispensing device, such as a hose (not shown). The main body 306 may include a port 318. The port 318 is sized and shaped to receive and hold a gauge, such as a pressure gauge (not shown).

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fluid delivery system that utilizes a quick coupling valve and valve key comprising:
    a coupling valve comprising a first end, an opposing second end, and a main body therebetween defining a fluid passageway, a valve stem, and a locking slot or groove formed around a perimeter of said valve stem lower portion configured to engage with a portion of a coupling valve key; and
    a coupling valve key comprising a first end, a second end, and a main body therebetween defining a fluid passageway and configured to secure or engage with said coupling valve and activate fluid flow.

2. The fluid delivery system that utilizes a quick coupling valve and valve key according to claim 1, wherein said coupling valve comprises a coupling valve key stop configured to prevent said coupling valve key from moving down said coupling valve main body when the two engage or interact.

3. The fluid delivery system that utilizes a quick coupling valve and valve key according to claim 1, wherein said valve stem comprises an upper portion having an inwardly tapered surface terminating in an opening, and a lower portion having a smaller diameter than said coupling valve a main body.

4. The fluid delivery system that utilizes a quick coupling valve and valve key according to claim 1, wherein said coupling valve comprises a cap configured to cover said valve stem.

5. The fluid delivery system that utilizes a quick coupling valve and valve key according to claim 1, wherein said coupling valve comprises a spring-loaded valve push pin shaft and a spring.

6. The fluid delivery system that utilizes a quick coupling valve and valve key according to claim 1, wherein said coupling valve key comprises at least one cam to aid in locking and engaging with said coupling valve to cause fluid flow.

7. The fluid delivery system that utilizes a quick coupling valve and valve key according to claim 1, wherein said coupling valve key comprises a lever arm traversable from a first position to a second position.

8. The fluid delivery system that utilizes a quick coupling valve and valve key according to claim 1, wherein said coupling valve key comprises a key locking member operationally connected to said lever arm.

9. The fluid delivery system that utilizes a quick coupling valve and valve key according to claim 8, wherein said coupling valve key locking member is configured to move in a linear direction in or out of a coupling valve key interior and engage or disengage with said coupling valve locking slot or groove when said level arm is rotated.

10. The fluid delivery system that utilizes a quick coupling valve and valve key according to claim 1, wherein said coupling valve key comprises a push pin shaft.

11. The fluid delivery system that utilizes a quick coupling valve and valve key according to claim 10, wherein said key push pin shaft is coupled to a first cam.

12. The fluid delivery system that utilizes a quick coupling valve and valve key according to claim 1, wherein said coupling valve spring-loaded valve push pin shaft comprises a receiving surface sized and shaped to receive said key push pin shaft.

13. The fluid delivery system that utilizes a quick coupling valve and valve key according to claim 1, further comprising a swivel, said swivel configured to engage or couple with a fluid dispensing device.

14. The fluid delivery system that utilizes a quick coupling valve and valve key according to claim 13, wherein said swivel comprises a port sized and shaped to receive and hold a gauge.

15. The fluid delivery system that utilizes a quick coupling valve and valve key according to claim 7, wherein said lever arm which, when rotated, causes said coupling valve key to lock to said coupling valve and cause water to flow when said coupling device is secured to water supply.

16. The fluid delivery system that utilizes a quick coupling valve and valve key according to claim 15, wherein when rotated, said lever arm is configured to first lock said coupling valve key to said coupling valve, and upon further rotation, cause said water to flow.

17. The fluid delivery system that utilizes a quick coupling valve and valve key according to claim 1, wherein when engaged or secured to said coupling valve, said coupling valve key is rotatable 360 degrees when in the locked or unlocked position.

18. The fluid delivery system that utilizes a quick coupling valve and valve key according to claim 10, wherein when rotated, said lever arm is configured to first lock said coupling valve key to said coupling valve, and upon further rotation, cause said water to flow.

19. A fluid delivery system that utilizes a coupling valve and valve key comprising:
- a coupling valve configured to allow water to travel therethrough comprising a first end, an opposing second end, and a main body therebetween defining a fluid passageway, a valve stem, and a locking groove formed around a perimeter of said valve stem lower portion; and
- a coupling valve key comprising a first end, a second end, and a main body therebetween defining a fluid passageway and configured to secure or engage with said coupling valve and activate fluid flow, said coupling valve key having a lever arm which, when rotated, causes said coupling valve key to lock to said coupling valve and cause water to flow when said coupling device is secured to water supply.

20. The fluid delivery system that utilizes a quick coupling valve and valve key according to claim 19, wherein when engaged or secured to said coupling valve, said coupling valve key is rotatable 360 degrees when in the locked or unlocked position.

\* \* \* \* \*